(12) United States Patent
Lai et al.

(10) Patent No.: US 7,831,854 B2
(45) Date of Patent: Nov. 9, 2010

(54) EMBEDDED SYSTEM FOR COMPENSATING SETUP TIME VIOLATION AND METHOD THEREOF

(75) Inventors: Ming-Shiang Lai, Hsin-Chu (TW); Chung-Hung Tsai, Hsin-Chu Hsien (TW)

(73) Assignee: Mediatek, Inc., Hsin-Chu (TW)

( * ) Notice: Subject to any disclaimer, the term of this patent is extended or adjusted under 35 U.S.C. 154(b) by 835 days.

(21) Appl. No.: 11/385,172

(22) Filed: Mar. 21, 2006

(65) Prior Publication Data
US 2007/0226442 A1   Sep. 27, 2007

(51) Int. Cl.
*G06F 1/14* (2006.01)
*G06F 1/08* (2006.01)
*G06F 13/00* (2006.01)
*G06F 12/00* (2006.01)

(52) U.S. Cl. .............. 713/400; 713/401; 713/500; 711/103; 711/167

(58) Field of Classification Search .......... 713/500, 713/400, 401; 711/103, 157
See application file for complete search history.

(56) References Cited

U.S. PATENT DOCUMENTS

| | | | |
|---|---|---|---|
| 5,835,936 A * | 11/1998 | Tomioka et al. ........... 711/103 |
| 6,523,132 B1 | 2/2003 | Harari et al. ................... 714/8 |
| 6,549,456 B2 | 4/2003 | Werner et al. ........ 365/185.03 |
| 6,684,345 B2 | 1/2004 | Harari et al. ................... 714/8 |
| 6,735,709 B1 * | 5/2004 | Lee et al. ..................... 713/401 |
| 6,850,107 B2 * | 2/2005 | Gomm ...................... 327/277 |
| 6,956,415 B2 | 10/2005 | Anand et al. |
| 6,981,136 B2 * | 12/2005 | Fuse et al. .................... 713/2 |
| 7,234,049 B2 * | 6/2007 | Choi et al. .................... 713/1 |
| 2002/0039325 A1 * | 4/2002 | Aizawa ..................... 365/233 |
| 2005/0018799 A1 * | 1/2005 | Boerstler et al. ........... 375/360 |
| 2005/0213593 A1 | 9/2005 | Anderson et al. |

FOREIGN PATENT DOCUMENTS

| | | |
|---|---|---|
| CN | 1399180 A | 2/2003 |
| JP | 200264476 A | 2/2002 |
| KR | 20030058851 | 7/2003 |
| TW | 586118 | 5/2004 |

OTHER PUBLICATIONS

CN office action mailed Mar. 3, 2008.
English Abstract for TW586118, May 1, 2004.
English Abstract for KR20030058851, Jul. 7, 2003.

* cited by examiner

*Primary Examiner*—Chun Cao
*Assistant Examiner*—Fahmida Rahman
(74) *Attorney, Agent, or Firm*—Thomas, Kayden, Horstemeyer & Risley, LLP

(57) ABSTRACT

The invention relates to an embedded system, and in particular, to an embedded system capable of compensating setup time violation. An embedded system comprises a serial flash and an access circuit. The serial flash further comprises an input pin and an output pin. The access circuit further comprises a processor, a shift register, a serial flash controller, and a time compensator. The input pin receives an adjusted input signal and the output pin sends an output signal. The processor controls the operation of the access circuit. The serial flash controller enables an operational clock of the access circuit. The time compensator compensates a timing of the output signal by referring to the operational clock. The shift register converts data in parallel form to serial form.

40 Claims, 20 Drawing Sheets

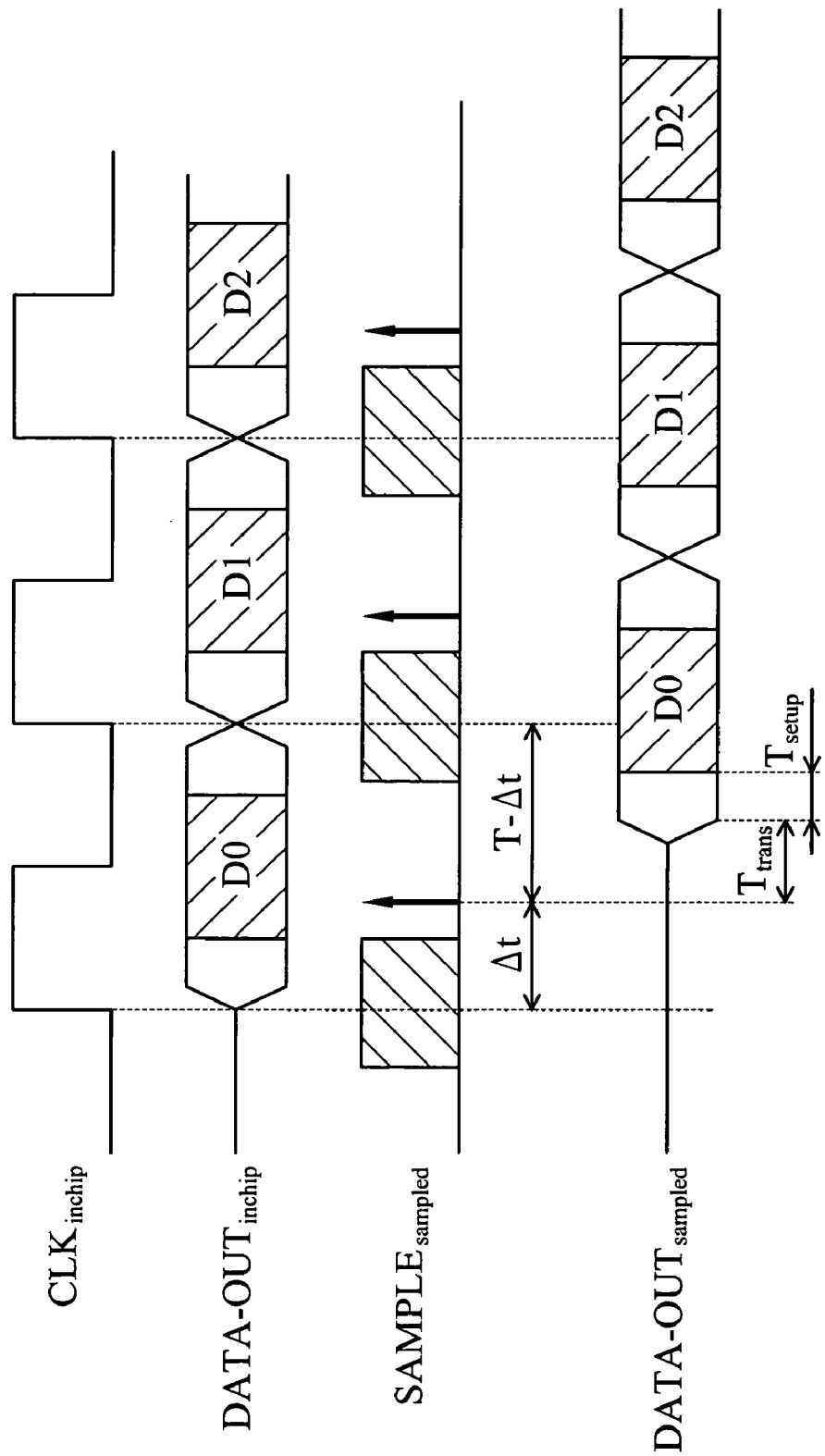

EMBEDDED SYSTEM FOR COMPENSATING SETUP TIME VIOLATION AND METHOD THEREOF

BACKGROUND

The invention relates to an embedded system, and in particular, to an embedded system for compensating setup time violation.

Embedded systems typically comprise flash memory such as serial flash or parallel flash for storing data and code. An embedded system requires a plurality of pins (address pins, data pins, and control pins) to access a parallel flash. Fewer pins are required to access a serial flash. Data rate of the serial flash is, however, getting faster and faster to make the setup time of various signals becomes critical and sensitive.

SUMMARY

An object of the invention is to provide an embedded system capable of compensating setup time violation. The embedded system comprises a serial flash and an access circuit. The serial flash further comprises an input pin and an output pin. The access circuit further comprises a processor, a shift register, a serial flash controller, and a time compensator. The input pin receives an adjusted input signal and the output pin sends an output signal. The processor controls the operation of the access circuit. The serial flash controller enables an operational clock of the access circuit. The time compensator compensates a timing of the output signal by referring to the operational clock. The shift register converts data in parallel form to serial form.

Another object of the invention is to provide an embedded system capable of adjusting time. The embedded system comprises a serial flash and an access circuit. The serial flash further comprises: a first input pin, a second input pin, and an output pin. The access circuit further comprises a processor, a shift register, a serial flash controller, a first time adjuster, and a second time adjuster. The first input pin receives an adjusted operational clock. The second input pin for receives an adjusted input signal. The output pin sends an output signal. The processor controls the operation of the access circuit. The serial flash controller enables an operational clock of the access circuit. The first time adjuster adjusts a timing of the operational clock to generate the adjusted operational clock. The second time adjuster adjusts a timing of an input signal to generate the adjusted input signal. The shift register converts data in parallel form to serial form.

Another object of the invention is to provide a method of controlling an embedded system. The method comprises: receiving an adjusted input signal; sending an output signal; enabling an operational clock; compensating a timing of the output signal by referring to the operational clock; converting data in parallel form to serial form.

Another object of the invention is to provide a method of controlling an embedded system. The method comprises: receiving an adjusted operational clock; receiving an adjusted input signal; sending an output signal; enabling an operational clock of the access circuit; adjusting a timing of the operational clock to generate the adjusted operational clock; adjusting a timing of an input signal to generate the adjusted input signal; converting data in parallel form to serial form.

DESCRIPTION OF THE DRAWINGS

The following detailed description, given by way of example and not intended to limit the invention solely to the embodiments described herein, will best be understood in conjunction with the accompanying drawings, in which:

FIGS. 11A~11C show timing diagrams of a plurality of signals in FIG. 8 in different situations;

DESCRIPTION

Figure 1:
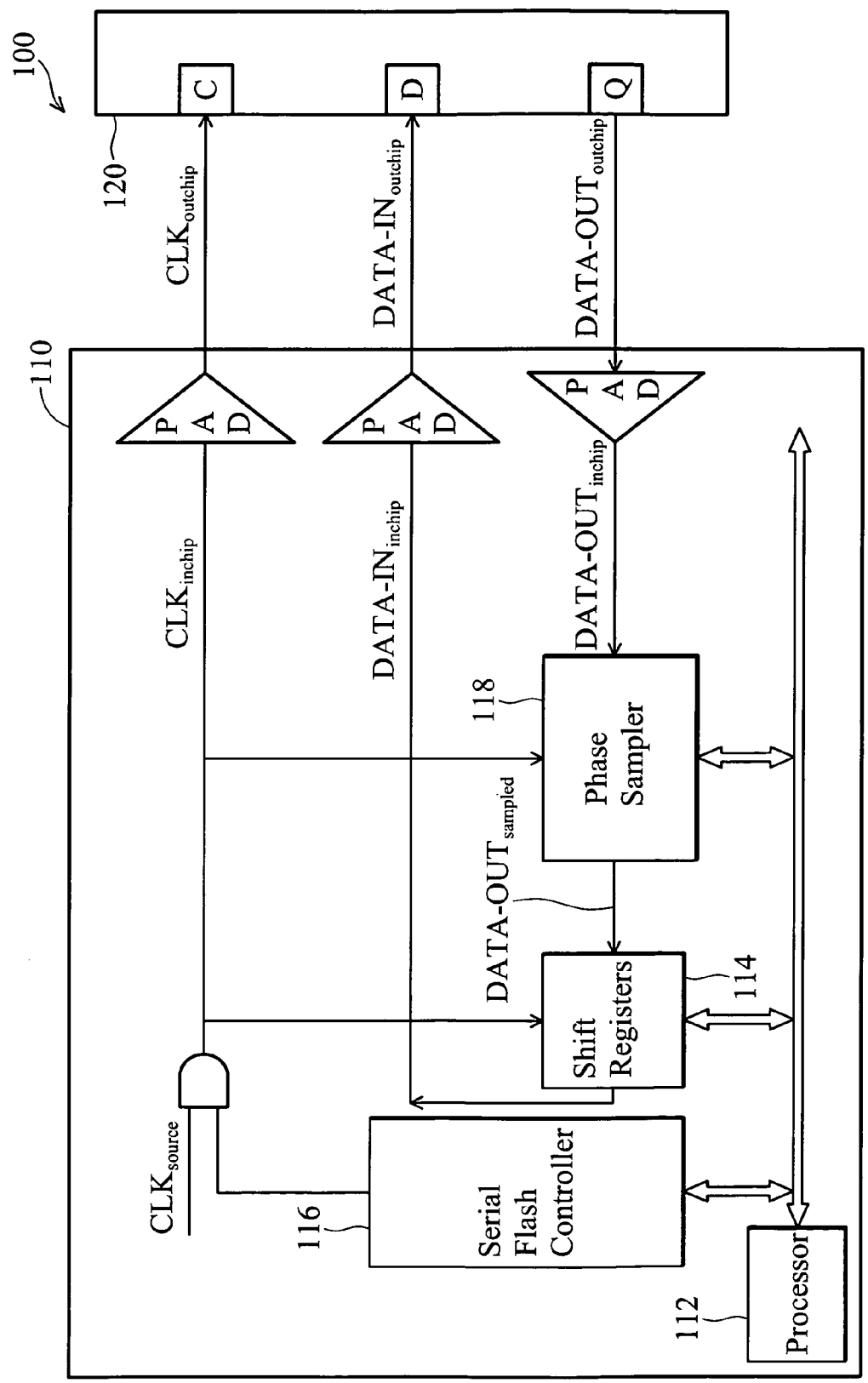
FIG. 1 shows a block diagram of an embedded system according to a first embodiment of the invention.

A detailed description of the invention is provided in the following. Please refer to FIG. 1. FIG. 1 shows a block diagram of an embedded system 100 according to a first embodiment of the invention. The embedded system 100 comprises a chip (e.g. ASIC) 110 and a serial flash 120. The chip 110 can read data from or write data to the serial flash 120 through three I/O pins C, Q, D. The chip comprises a processor (e.g. CPU) 112, a plurality of parallel-to-serial shift registers 114, a serial flash controller 116, and a phase sampler 118. The processor 112 controls the entire operation of the chip 110. The plurality of parallel-to-serial shift registers 114 convert parallel signals to serial signals. The serial flash controller 116 enables a free-run clock $CLK_{source}$ to generate an operational clock $CLK_{inchip}$ for a period of $Count_{bit}$ cycles. $Count_{bit}$ is a parameter provided by the processor 112. The clock $CLK_{inchip}$ is taken as the operational clocks of the chip 110 and the serial flash 120. If there is no data traffic between the chip 110 and the serial flash 120, the operational clock $CLK_{inchip}$ is gated; Otherwise, the operational clock $CLK_{inchip}$ is activated. An input signal $DATA\text{-}IN_{inchip}$ is shifted from the chip 110 to the serial flash 120 through the input pin D. An output signal $DATA\text{-}OUT_{outchip}$ is shifted from the serial flash 120 to the chip 110 through the output pin Q. The output signal $DATA\text{-}OUT_{outchip}$ is sent into the chip 110 to become an adjusted output signal $DATA\text{-}OUT_{inchip}$ after being adjusted for a propagation time. Unfortunately, a setup time of the adjusted output signal $DATA\text{-}OUT_{inchip}$ is shortened and inadequate due to the above-mentioned propagation time. Hence, the phase sampler 118 samples the adjusted output signal $DATA\text{-}OUT_{inchip}$ to generate a compensated output signal $DATA\text{-}OUT_{sampled}$ to solve the shortened setup time problem. A detailed description of solving the setup time problem is provided in the following.

Figure 2:
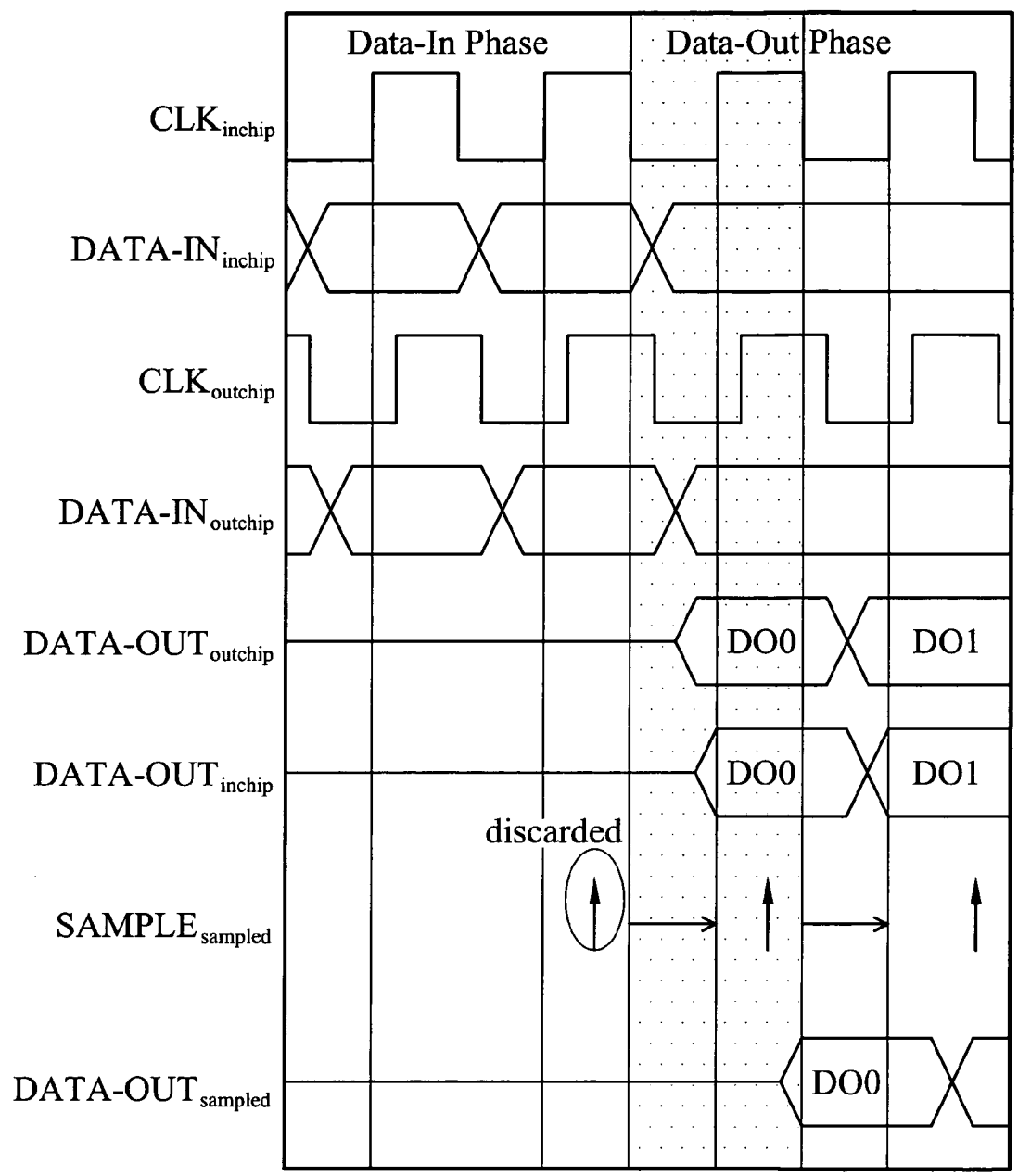
FIG. 2 shows a timing diagram of a plurality of signals in FIG. 1.

Please refer to FIG. 1 and FIG. 2 at the same time. FIG. 2 shows a timing diagram of a plurality of signals in FIG. 1. Please note that the data signals are fetched at positive edges of the clock in this figure. However, data signals can also be fetched at the negative edges of the clock. The data signals and clocks are described in greater depth in the following. The operational clock $CLK_{inchip}$ is sent into the serial flash 120 to become an adjusted operational signal $CLK_{outchip}$ after being adjusted for a propagation time. The input signal $DATA\text{-}IN_{inchip}$ is sent into the serial flash 120 to become an adjusted input signal $DATA\text{-}IN_{outchip}$ after being adjusted for a propagation time. The output signal $DATA\text{-}OUT_{outchip}$ is sent into the chip 110 to become the adjusted output signal $DATA\text{-}OUT_{inchip}$ after being adjusted for a propagation time. It can be observed that the latency between the operational clock $CLK_{inchip}$ and the adjusted output signal $DATA\text{-}OUT_{inchip}$ is enlarged (about twice the propagation time) and the setup time of the adjusted output signal $DATA\text{-}OUT_{inchip}$ is thus shortened. In this embodiment, in order to compensate for the shortened setup time, the phase sampler 118 samples the adjusted output signal $DATA\text{-}OUT_{inchip}$ according to a sampling signal $SAMPLE_{sampled}$ to generate a compensated output signal $DATA\text{-}OUT_{sampled}$ to solve the shortened setup time problem.

Additionally, a first sample of the sampling signal $SAMPLE_{sampled}$ must be discarded. In some embodiments, the higher the clock speed, the more samples are discarded. The discarded sample number $Count_{discard}$ is a parameter provided by the processor 112. A detailed-description of the phase sampler 118 is provided in the following.

Figure 3:
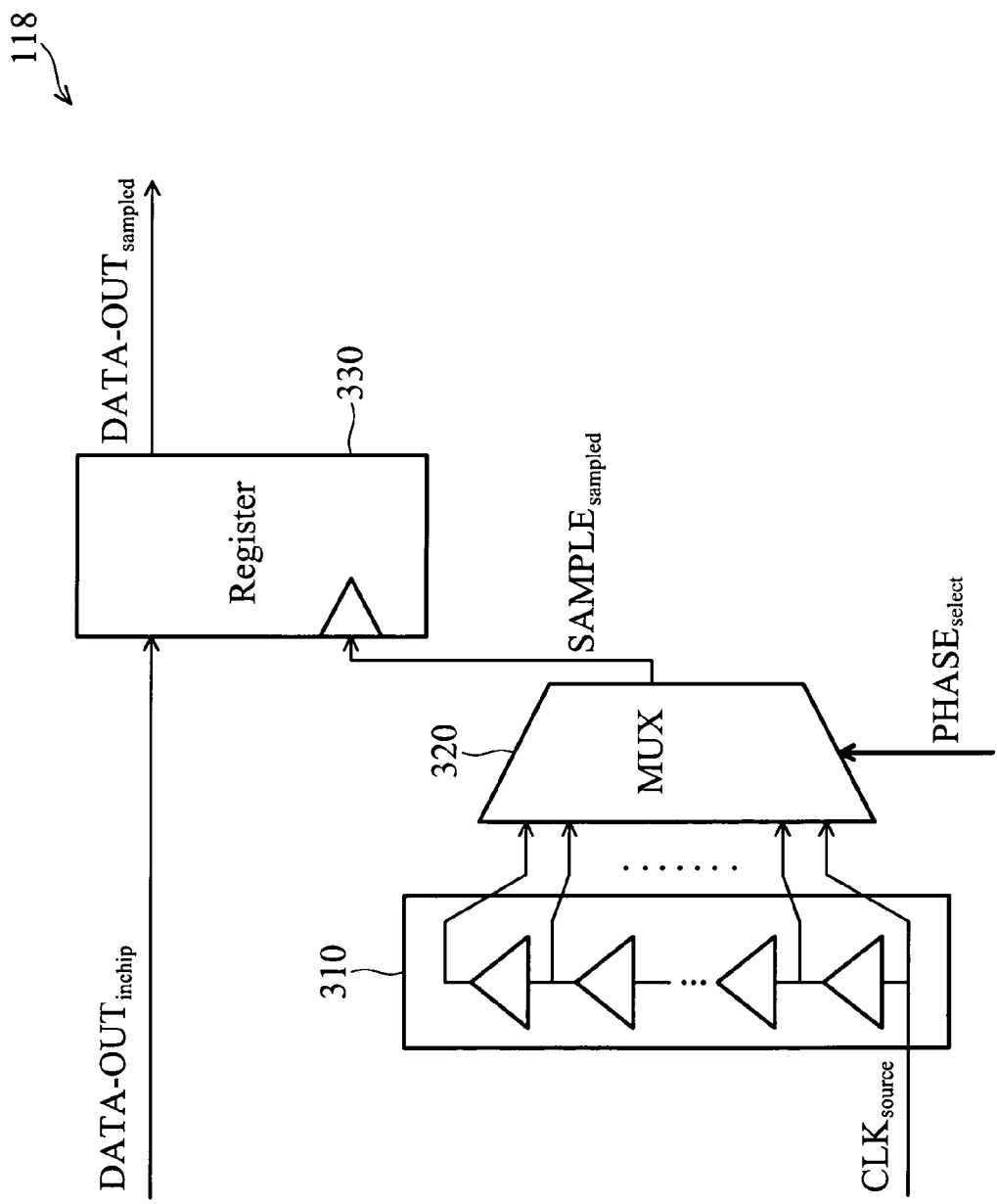
FIG. 3 shows a circuit diagram of the phase sampler in FIG. 1.

Please refer to FIG. 1 and FIG. 3 at the same time. FIG. 3 shows a circuit diagram of the phase sampler 118 in FIG. 1. The phase sampler 118 comprises a delay chain 310, a multiplexer (MUX) 320, and a register 330. The delay chain 310 further comprises a plurality of delay buffers. Each delay buffer can provide different delay phases of the adjusted output signal $DATA\text{-}OUT_{inchip}$. The MUX 320 selects one signal from the plurality of delay buffers as the sampling signal $SAMPLE_{sampled}$ according to a phase selection parameter $PHASE_{select}$. There are various ways to determine the phase selection parameter $PHASE_{select}$; one is to utilize a trial-and-error method to attempt every phase and compare the read back data signal with a pattern (e.g. golden pattern) stored in memory (not shown) to find a best phase selection parameter $PHASE_{select}$. The adjusted output signal $DATA\text{-}OUT_{inchip}$ can then be sampled to generate the compensated output signal $DATA\text{-}OUT_{sampled}$ according to the sampling signal $SAMPLE_{sampled}$ through the register 330. Note that there are various kinds of phase samplers. Other kinds of phase samplers are detailed in the following.

Figure 4A:
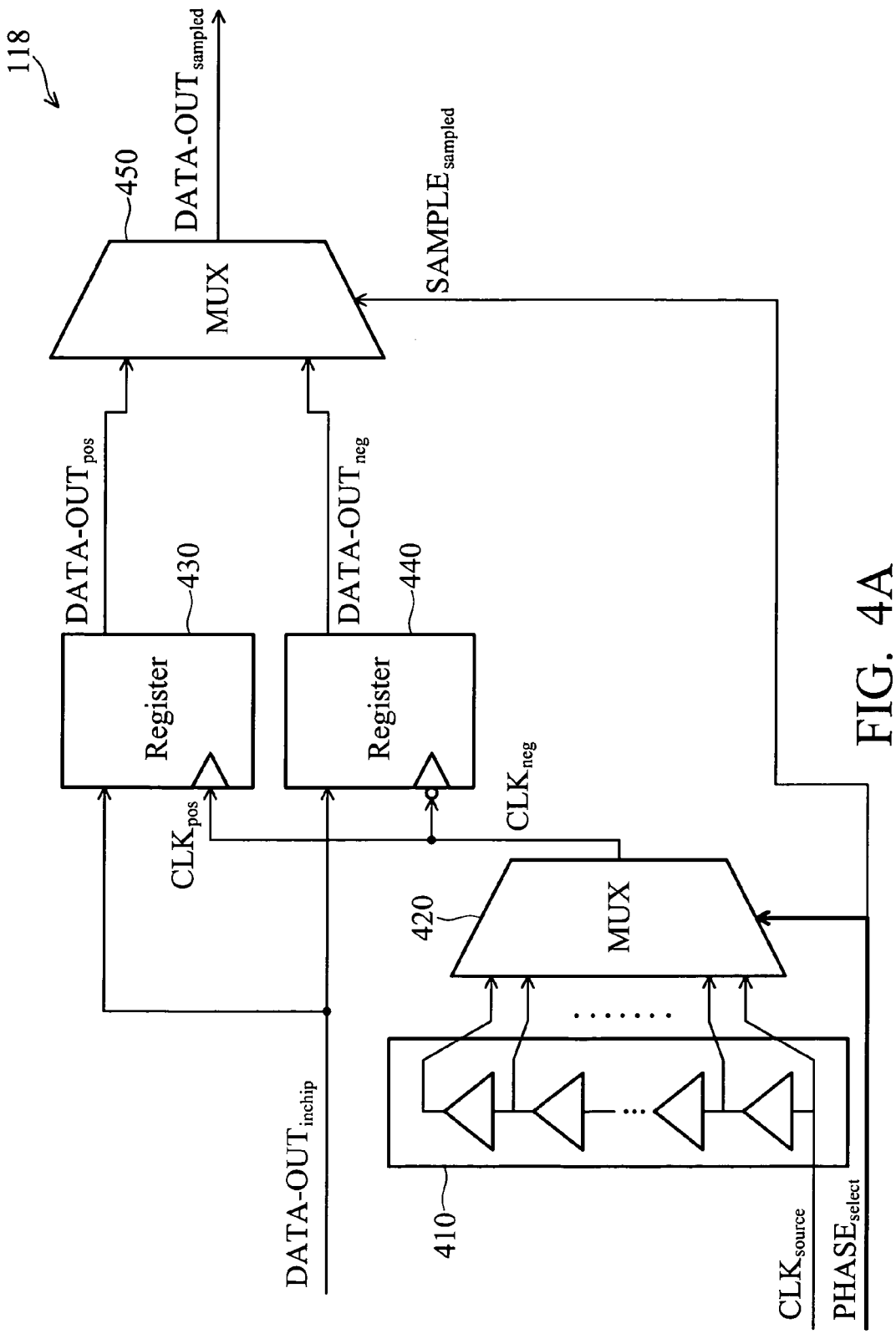
FIG. 4A shows a circuit diagram of the phase sampler in FIG. 1.
Figure 4B:
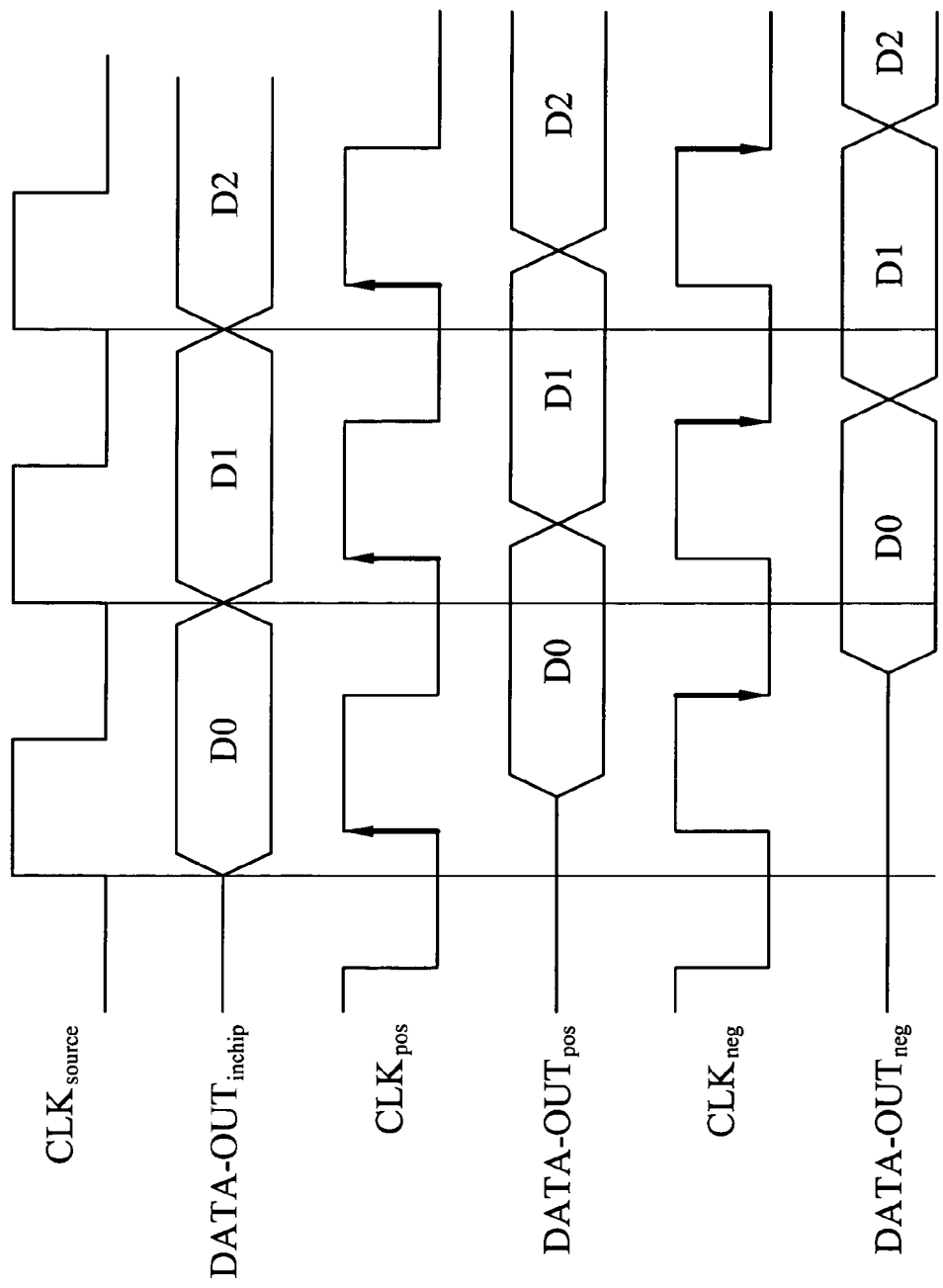
FIG. 4B shows a timing diagram of a plurality of signals in FIG. 4A.

Please refer to FIG. 4A and FIG. 4B at the same time. FIG. 4A shows another circuit diagram of the phase sampler 118 in FIG. 1. FIG. 4B shows a timing diagram of a plurality of signals in FIG. 4A. The phase sampler 118 comprises a delay chain 410, multiplexers (MUX) 420 and 450, and registers 430 and 440. A detailed description of elements in FIG. 4A sharing the same labels as in FIG. 3 is omitted for the sake of brevity. In FIG. 4A, a key difference with FIG. 3 is that an extra negative-edge-clock-triggered register 440 is added in order to reduce the number of delay buffers in the delay chain 410. The registers 430 and 440 utilize positive and negative edge triggered clocks $CLK_{pos}$ and $CLK_{neg}$ to sample the adjusted output signal $DATA\text{-}OUT_{inchip}$ and generate a positive edge triggered data signal $DATA\text{-}OUT_{pos}$ and a negative edge triggered data signal $DATA\text{-}OUT_{neg}$, respectively. Finally the MUX 450 selects the positive edge triggered data signal $DATA\text{-}OUT_{pos}$ and the negative edge triggered data signal $DATA\text{-}OUT_{neg}$ periodically to output the compensated output signal $DATA\text{-}OUT_{sampled}$. Please refer to FIG. 4B. The required number of delay buffers is reduced by half (compared with FIG. 3) since the positive (rising) and negative (falling) edges of the operational clock $CLK_{inchip}$ are utilized at the same time.

Figure 5:
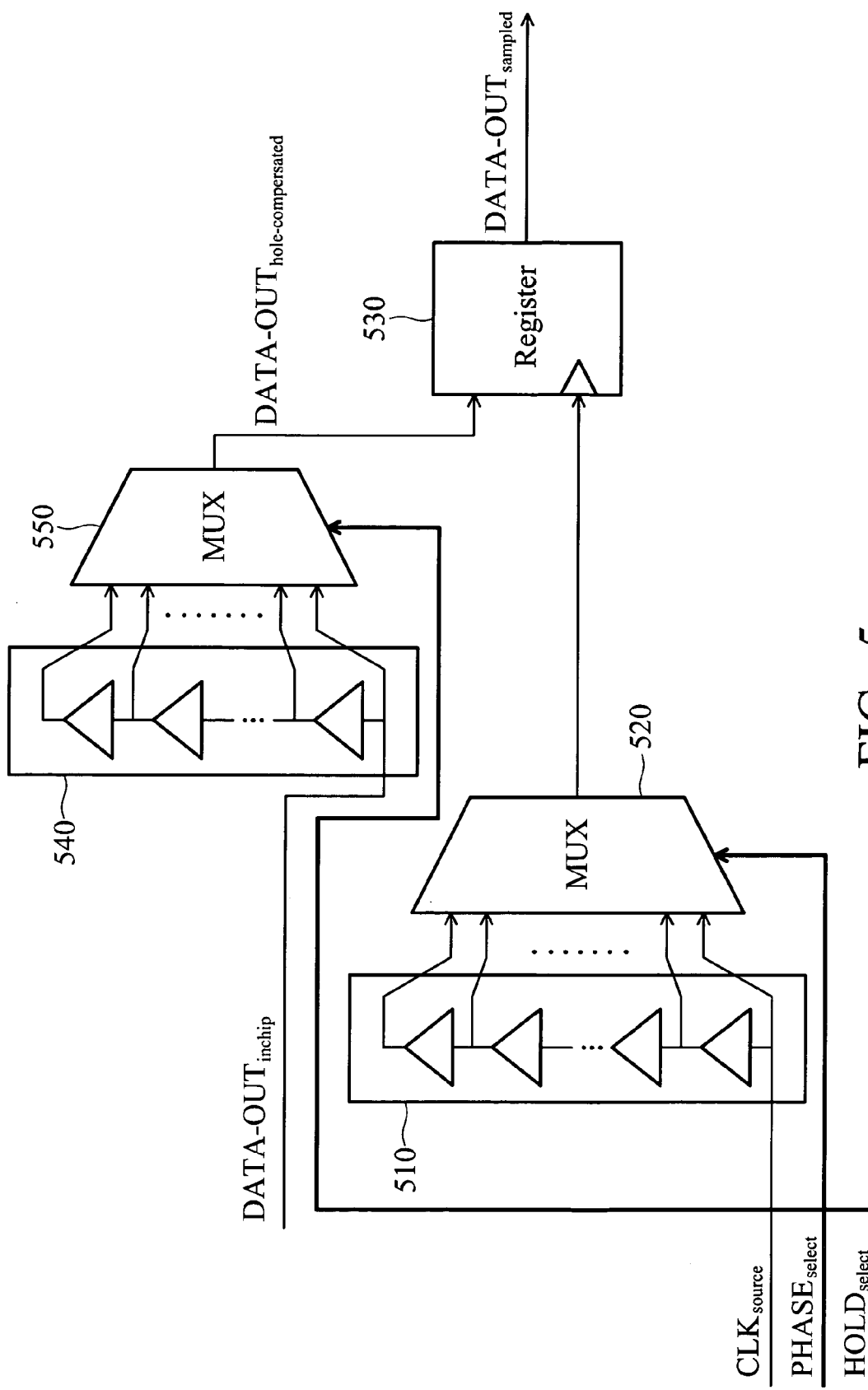
FIG. 5 shows a circuit diagram of the phase sampler in FIG. 1.

Please refer to FIG. 5. FIG. 5 shows another circuit diagram of the phase sampler 118 shown in FIG. 1. The phase sampler 118 comprises delay chains 510 and 540, multiplexers (MUX) 520 and 550, and a register 530. A detailed description of elements in FIG. 5 sharing the same labels as in FIG. 3 is omitted for the sake of brevity. In FIG. 5, a key difference with FIG. 3 is that an extra delay chain 540 is added in order to tune phases in deeper depth. It is clear that if the sampling phase can be tuned continuously, the optimal sampling phase will be easily obtained. There exists, however, a minimum time unit of the delay chain, which limits the sampling phase to being tuned continuously. If the minimum time unit is too long, the hold time may not be enough. To compensate for the hold time, the delay chain 540 is added to further tune the phase of the adjusted output signal $DATA\text{-}OUT_{inchip}$ to generate the hold time compensated data signal $DATA\text{-}OUT_{hold\text{-}compensated}$.

Figure 6:
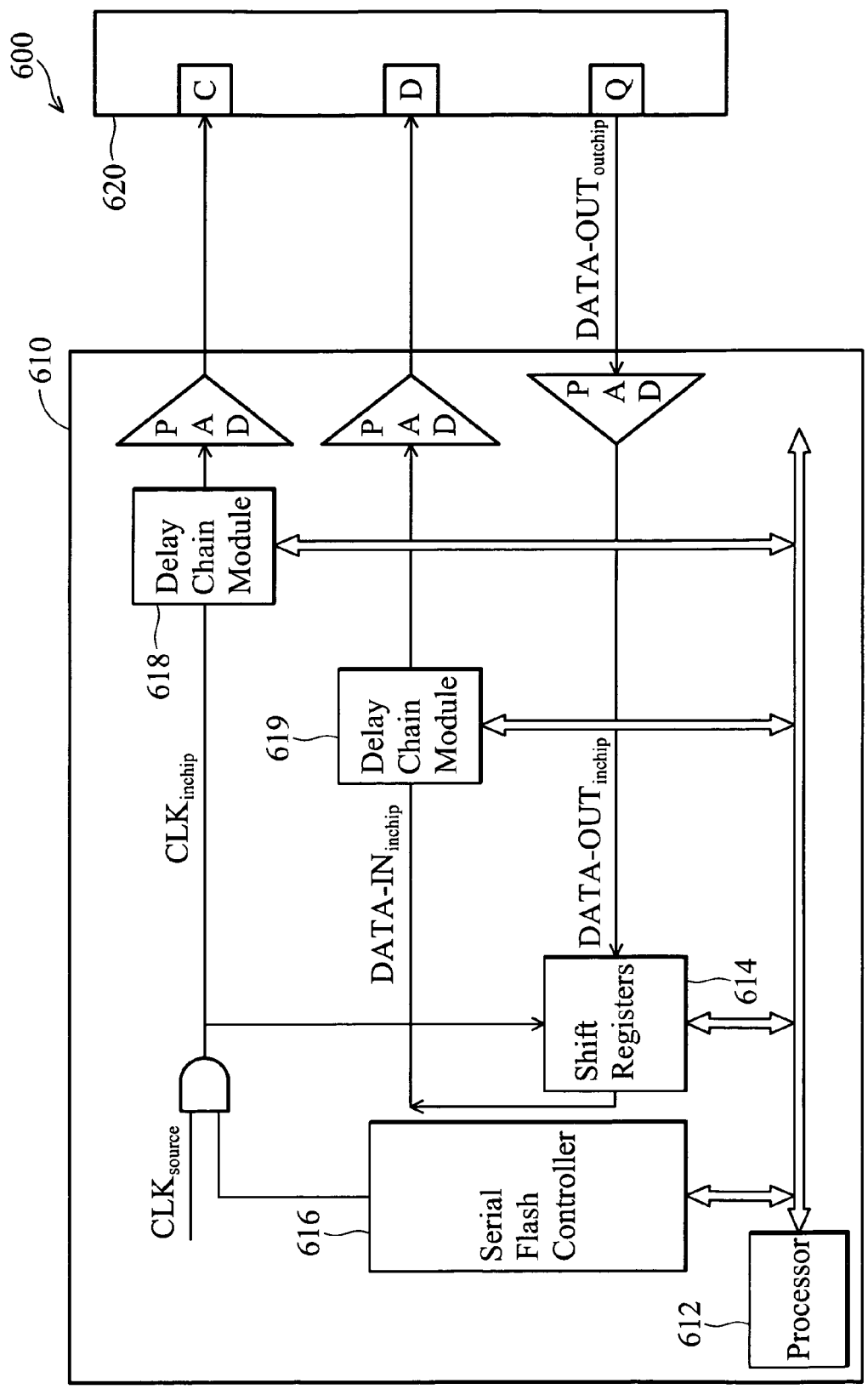
FIG. 6 shows a block diagram of an embedded system according to a second embodiment of the invention.

Please refer to FIG. 6. FIG. 6 shows a block diagram of an embedded system 600 according to a second embodiment of the invention. A detailed description of elements in FIG. 6 sharing the same labels as in FIG. 1 is omitted for the sake of brevity. In the second embodiment, a key difference with the first embodiment is that a phase sampler 118 is replaced with a plurality of delay chain modules. The delay chain modules 618 and 619 are utilized to tune phases of the operational clock $CLK_{inchip}$ and the input signal $DATA\text{-}IN_{inchip}$, respectively. It can also solve the shortened setup time problem of the output signal $DATA\text{-}OUT_{outchip}$. In other words, the phase of the output signal $DATA\text{-}OUT_{outchip}$ (embodiment 1) can be tuned or the phases of the operational clock $CLK_{inchip}$ and the input signal $DATA\text{-}IN_{inchip}$ (embodiment 2) can be tuned.

Figure 7:
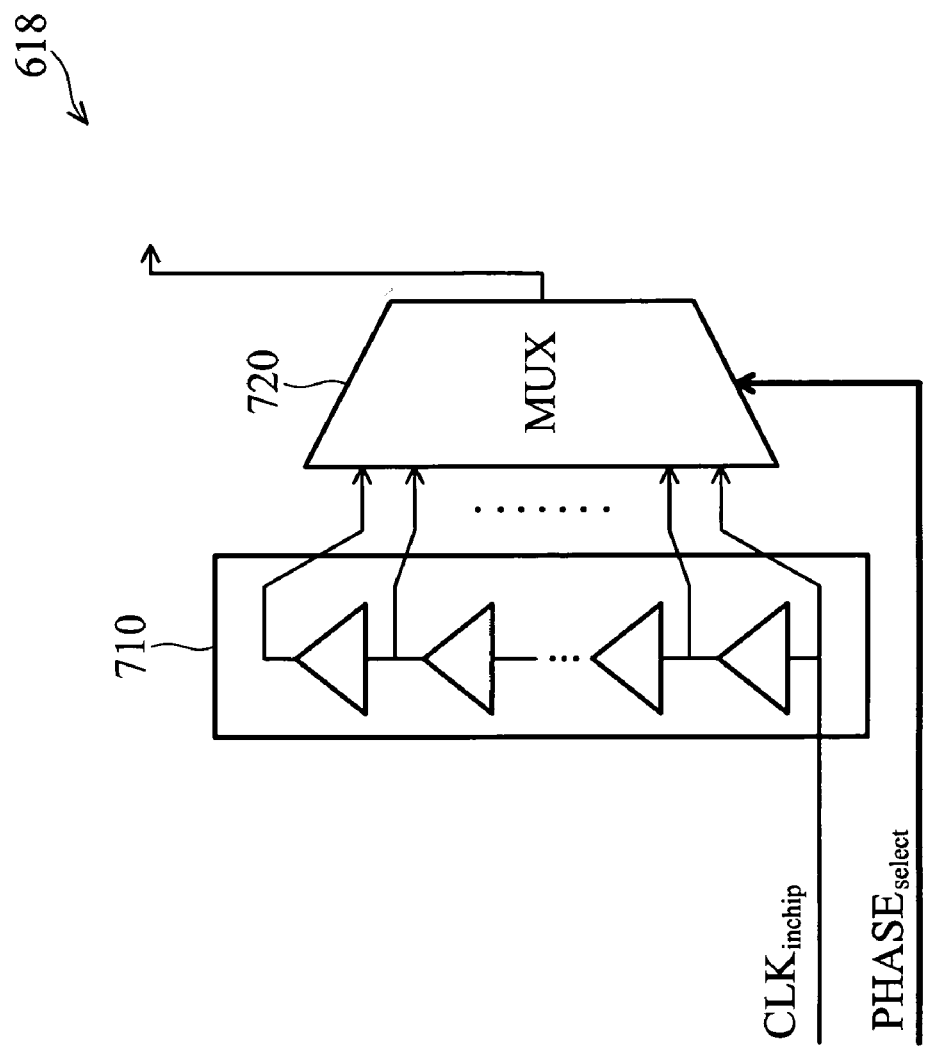
FIG. 7 shows a circuit diagram of one delay chain in FIG. 6.

Please refer to FIG. 6 and FIG. 7 at the same time. FIG. 7 shows a circuit diagram of one delay chain module in FIG. 6. The delay chain module 618 comprises a delay chain 710 and a MUX 720. The delay chain 710 further comprises a plurality of delay buffers. Each delay buffer can provide different delay phases of the operational clock $CLK_{inchip}$. The MUX 720 selects one signal from the plurality of delay buffers to accomplish the task of phase tuning.

Figure 8:
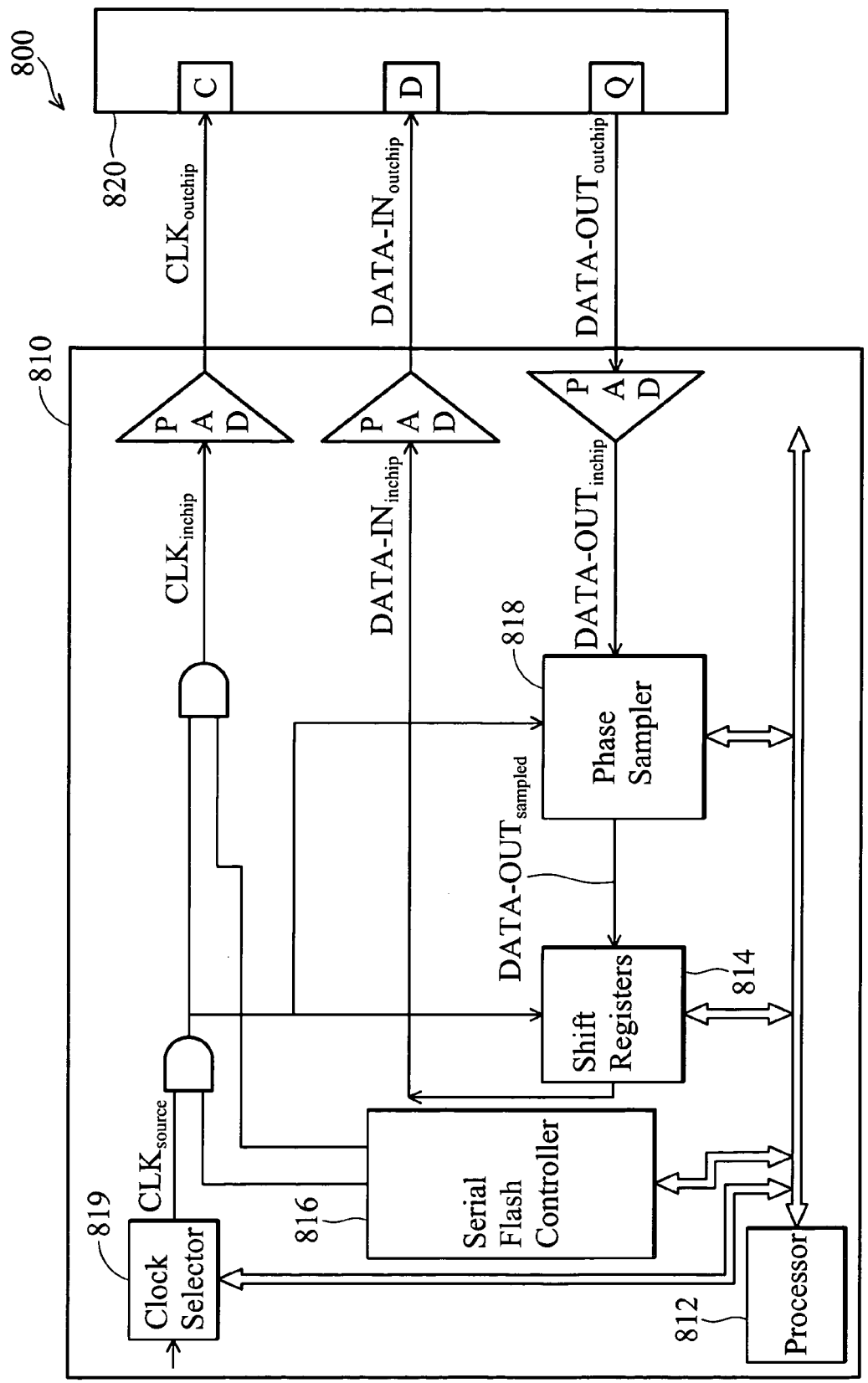
FIG. 8 shows a block diagram of an embedded system according to a third embodiment of the invention.
Figure 9:
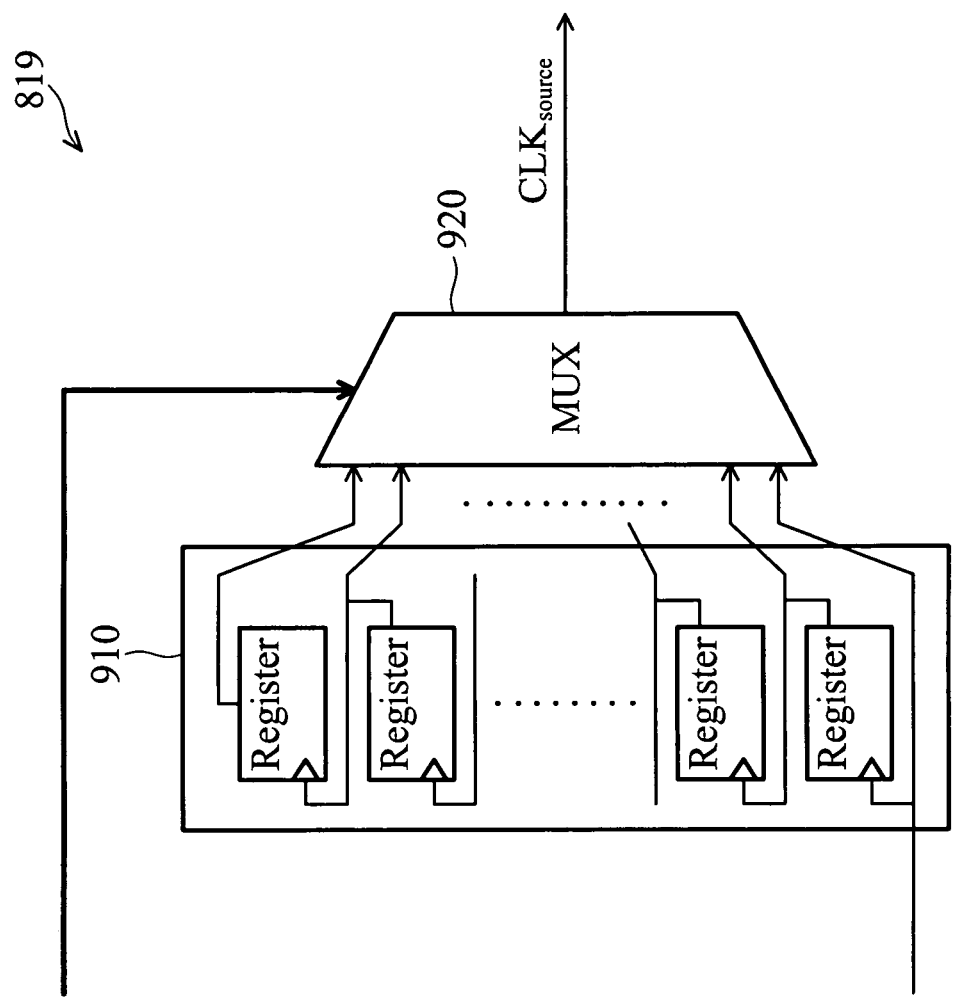
FIG. 9 shows a circuit diagram of the clock selector 819.
Figure 10A:
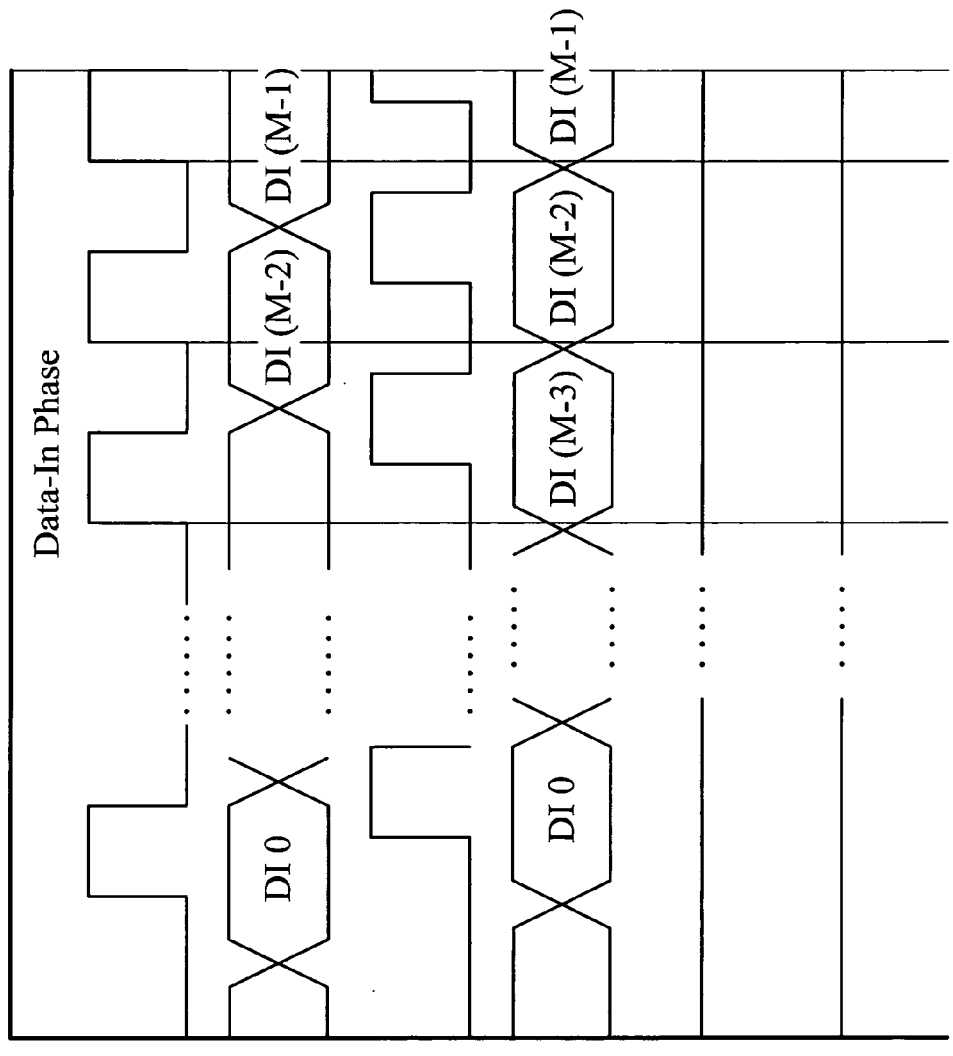
FIG. 10A-FIG. 10D show timing diagrams of a plurality of signals in FIG. 8.
Figure 10A:
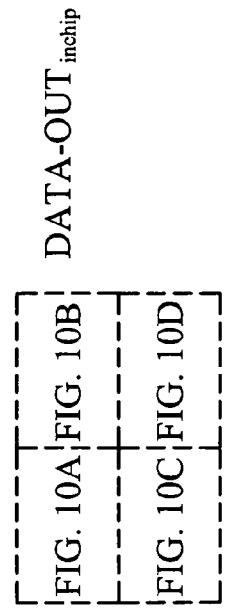
Figure 10B:
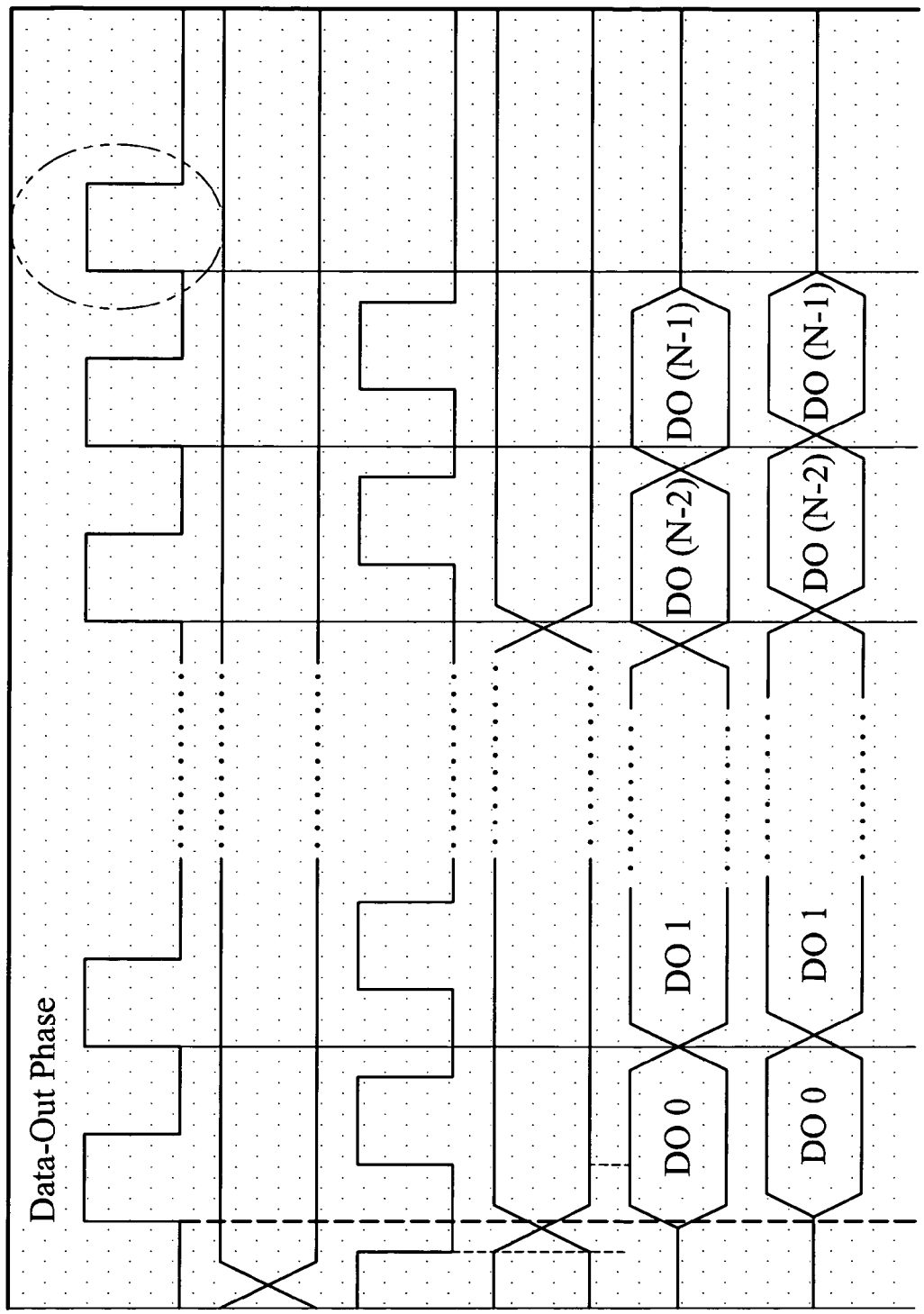
Figure 10C:
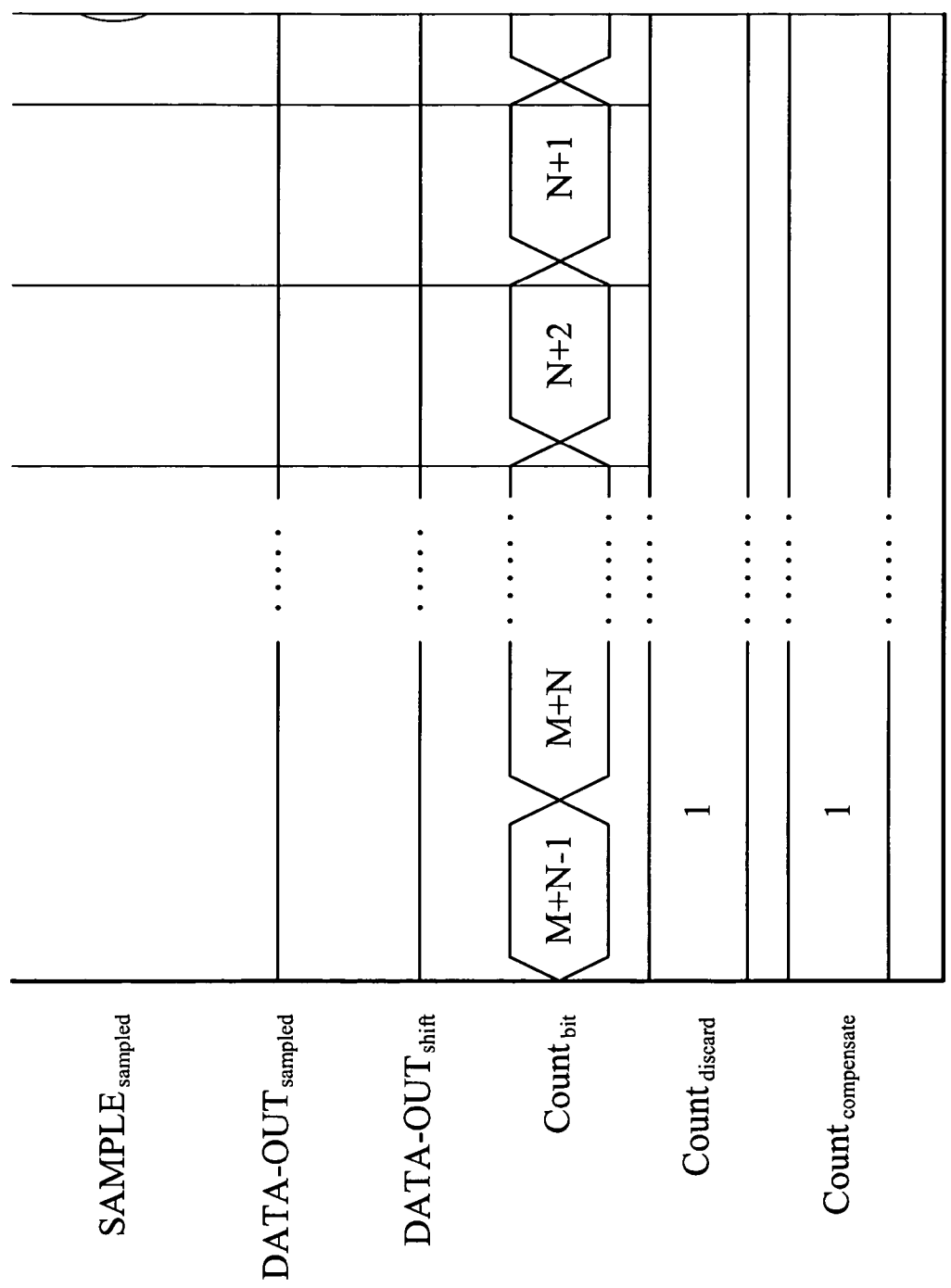
Figure 10D:
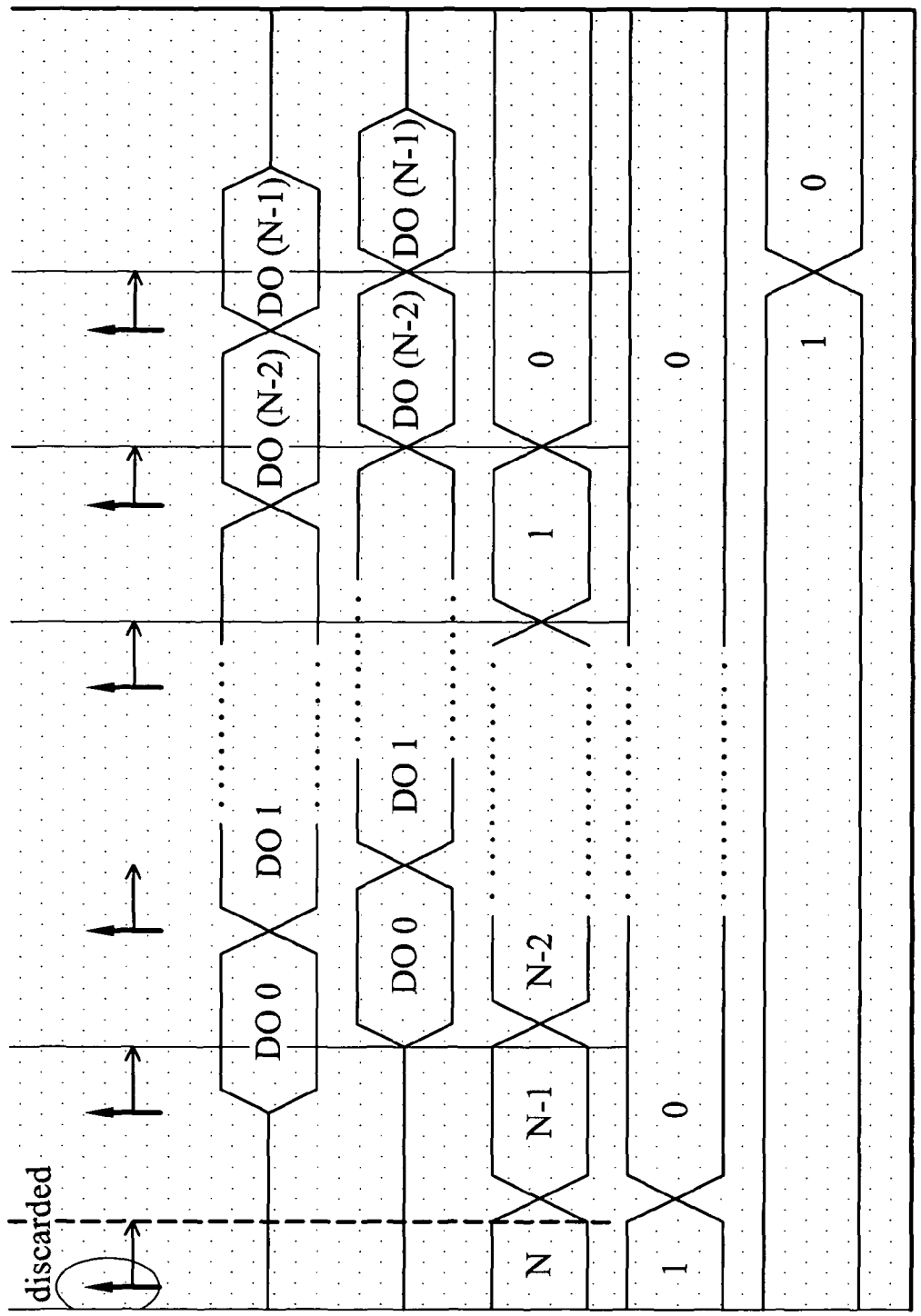

Please refer to FIG. 8~FIGS. 10A-10D at the same time. FIG. 8 shows a block diagram of an embedded system 800 according to a third embodiment of the invention. A detailed description of elements in FIG. 8 sharing the same labels as in FIG. 1 is omitted for the sake of brevity. In the third embodiment, a key difference with the first embodiment is that a clock selector 819 is added in the embedded system 800 to provide the operational clock CLKsource with tunable frequency. The process of solving a critical path problem will be further provided later. Please refer to FIG. 9. FIG. 9 shows a circuit diagram of the clock selector 819. The clock selector 819 is a clock divider, which comprises a plurality of registers 910 and a MUX 920, to select a proper free-run clock CLKsource from a plurality of clocks with different frequencies. Please note that there are various kinds of clock selectors. The clock divider is only taken as an example, not a limitation. Please refer to FIGS. 10A-10D. FIGS. 10A-10D show a timing diagram of a plurality of signals in FIG. 8. Please note that the data signals are fetched at positive edges of the clock in this figure. Assume that the parameter Countbit is equal to M+N wherein M and N are positive integers respectively representing the number of bits transmitted to and received from the chip 810. M bit data is transmitted in the data-in phase, X bit data is discarded in the data-out phase according to the parameter Countdiscard, (N−X) bit data is received in the data-out phase, and X bit data is further received in the data-out phase to compensate for the discarded X bit data according to the parameter Countcompensate. In other words, although X bit data is discarded, the total received bit data is still equal to N ((N−X)+X=N). In this embodiment, the variable X here is equal to 1. A detailed description of dealing the critical path issue is provided in the following.

Figure 11B:
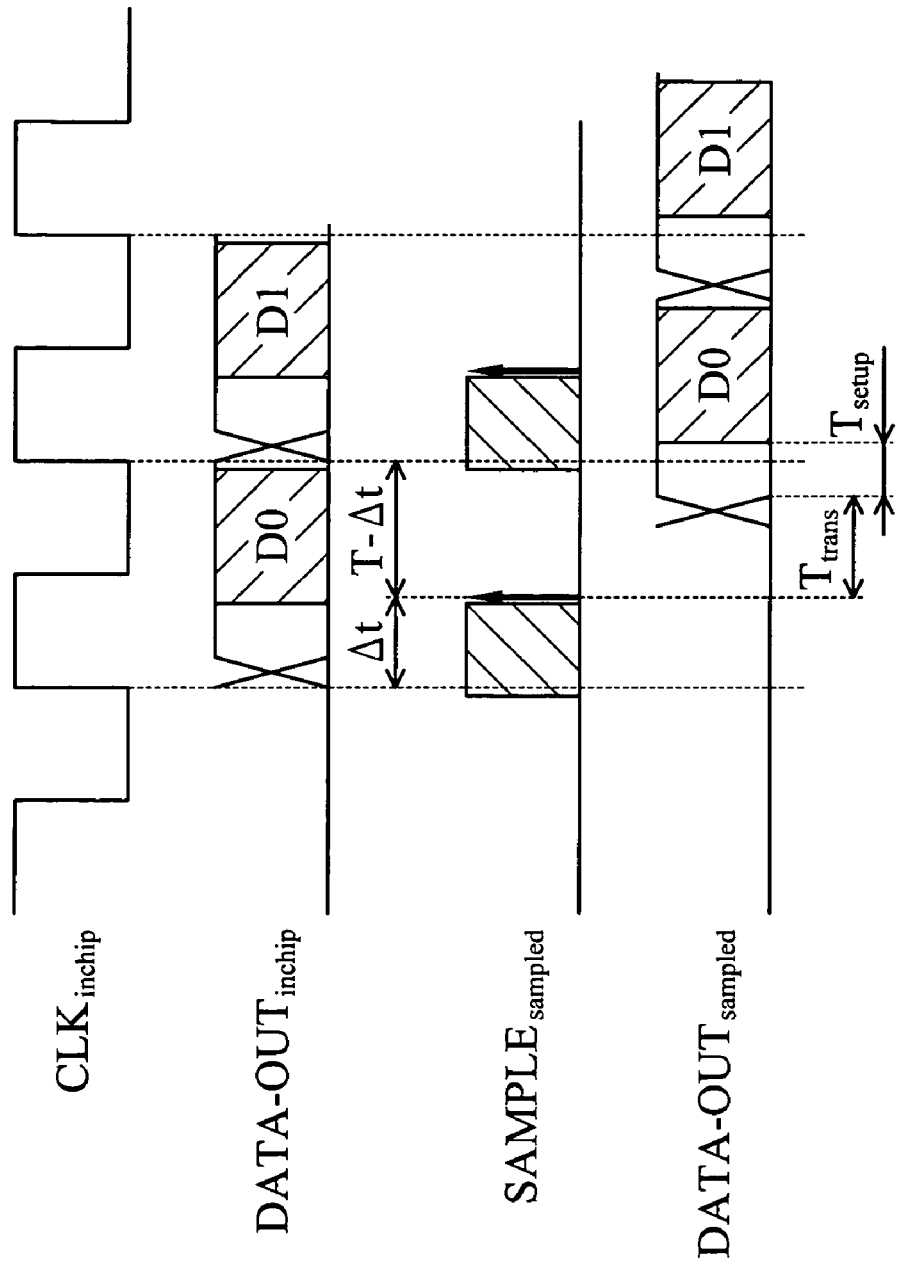
Figure 11C:
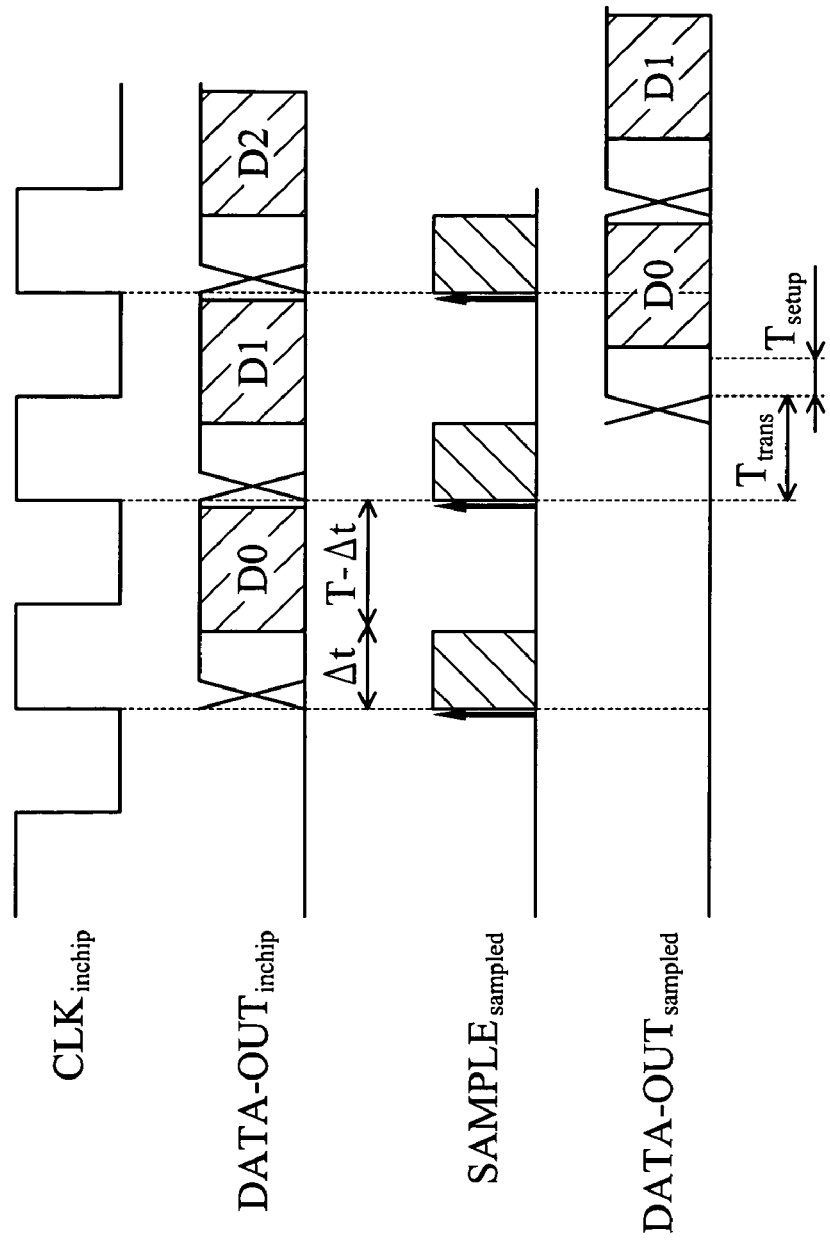

Please refer to FIGS. 11A~11C. FIGS. 11A~11C show timing diagrams of a plurality of signals in FIG. 8 in different situations. In FIG. 11A, the frequency of the operational clock $CLK_{inchip}$ is too low to induce the critical path problem. However, in FIG. 11B and FIG. 11C, the frequency of the operational clock $CLK_{inchip}$ is high enough to induce the critical path problem. The frequency of the operational clock $CLK_{inchip}$ is said to be high if it satisfies the following equation:

$$T - \Delta t < T_{setup} + T_{trans}$$

Wherein T is a period of the operational clock $CLK_{inchip}$, $\Delta t$ is a time difference between an edge of the operational clock $CLK_{inchip}$ and a sampling time of the sampling signal $SAMPLE_{sampled}$, $T_{setup}$ is a setup time depending on a manufacturing process, and $T_{trans}$ is affected by the distance between the phase sampler 818, and the parallel-to-serial shift registers 814 is a time that the compensated output signal DATA-$OUT_{sampled}$ becomes valid after the sampling time. FIG. 11A shows that there is no setup time violation in the compensated output signal DATA-$OUT_{sampled}$ since no critical path problem occurs and therefore no compensation is required. FIG. 11B shows the setup time violation in the compensated output signal DATA-$OUT_{sampled}$ and hence the compensated output signal DATA-$OUT_{sampled}$ is incorrect. FIG. 11C shows the setup time violation compensation in the compensated output signal DATA-$OUT_{sampled}$. A detailed description of the setup time violation compensation due to the critical path issue is provided in the following.

Please refer to FIG. 11C. The sampling phase of the phase sampler 814 is adjusted to make the valid region of the compensated output signal DATA-$OUT_{sampled}$ overlap with the positive edge of the operational clock $CLK_{inchip}$. Then the discard count parameter is increased to delay one clock cycle of the compensated output signal DATA-$OUT_{sampled}$ to finish the setup time violation compensation procedure. Finally, the setup time violation of the compensated output signal DATA-$OUT_{sampled}$ is compensated.

Figure 12:
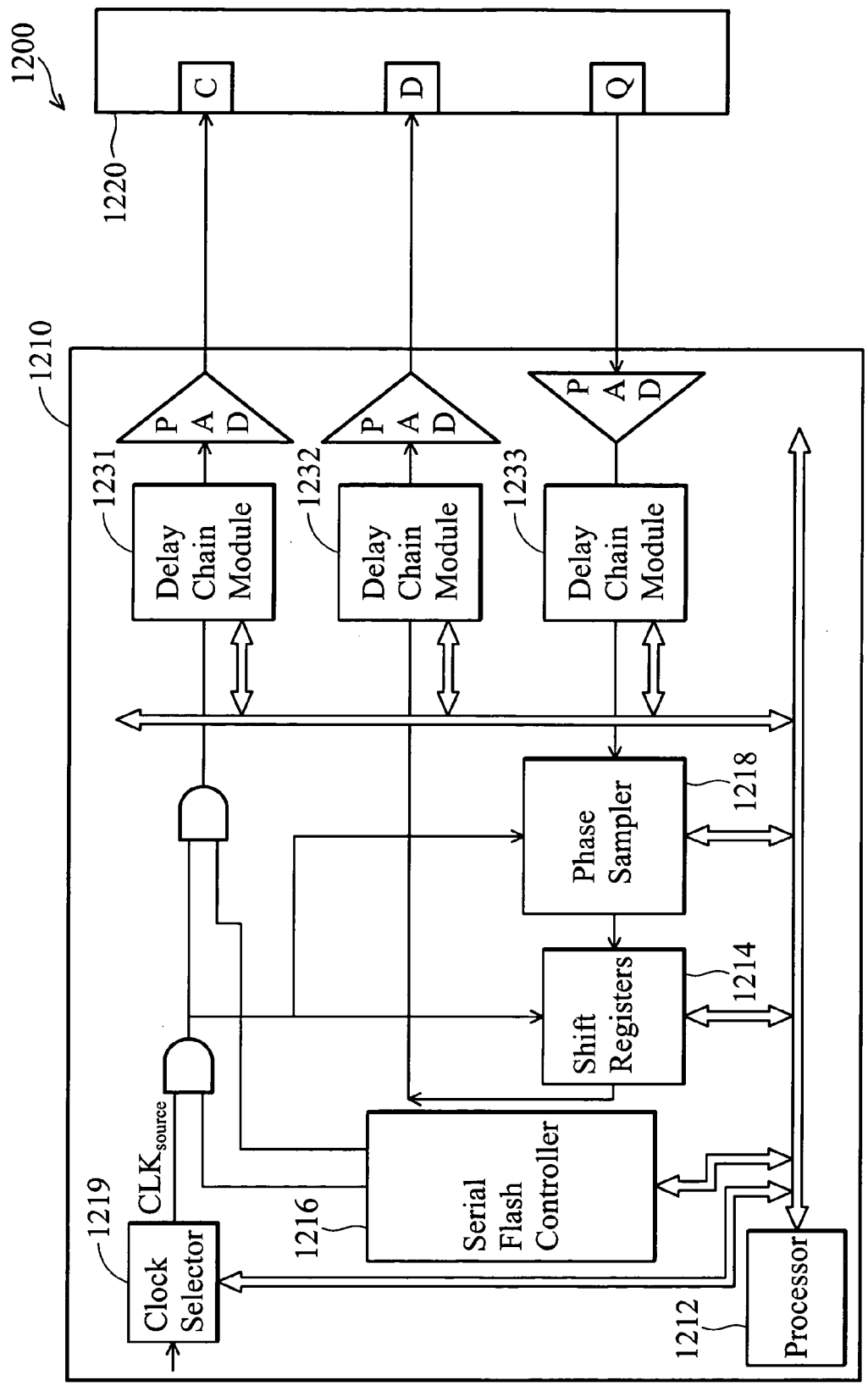
FIG. 12 shows a block diagram of an embedded system according to a fourth embodiment of the invention.

Please refer to FIG. 12. FIG. 12 shows a block diagram of an embedded system 1200 according to a fourth embodiment of the invention. A detailed description of elements in FIG. 12 sharing the same labels as in FIG. 8 is omitted for the sake of brevity. In the fourth embodiment, a key difference with the third embodiment is that a plurality of delay chain modules 1231~1233 are added to compensate for the skew due to physical layout of the chip 1210.

Figure 13:
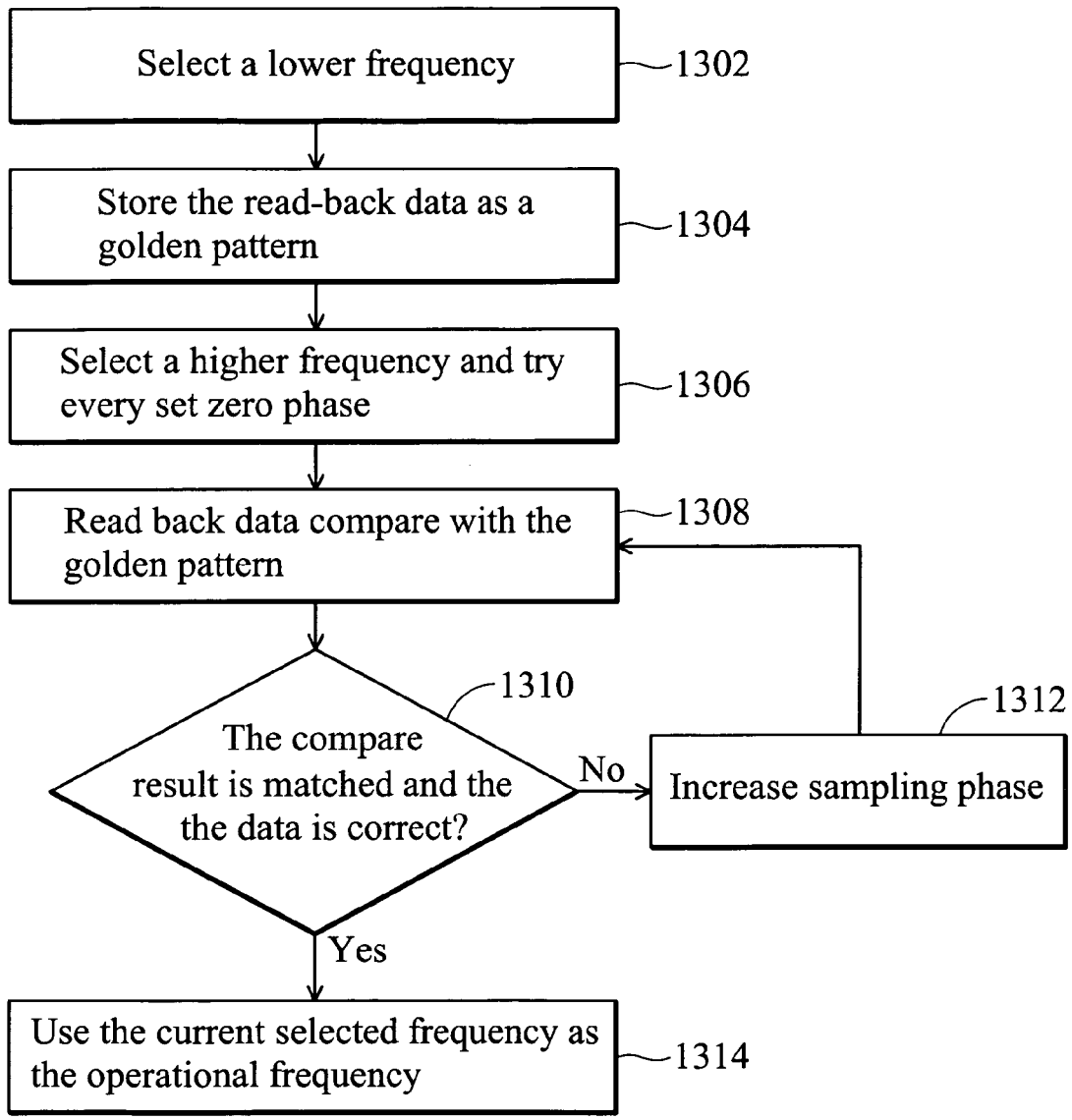
FIG. 13 is a flow chart of a control method applied to an embedded system.

Please refer to FIG. 13. FIG. 13 is a flow chart of a controlling method applied to an embedded system. The steps of the method are given in the following.

Step 1302: Select a lower frequency at which the read-back data from the serial flash is correct.

Step 1304: Store the read-back data into its memory as a golden pattern.

Step 1306: Select a higher frequency and try every set zero phase. Discard the first sample in the data-out phase.

Step 1308: Read back data from the serial flash and compare the read-back data with the golden pattern.

Step 1310: Determine if the comparison result is matched and if the data is correct. If yes, proceed to step 1314; Otherwise proceed to step 1312.

Step 1312: Increase sampling phase.

Step 1314: Use the current selected frequency as the operational frequency.

Figure 14:
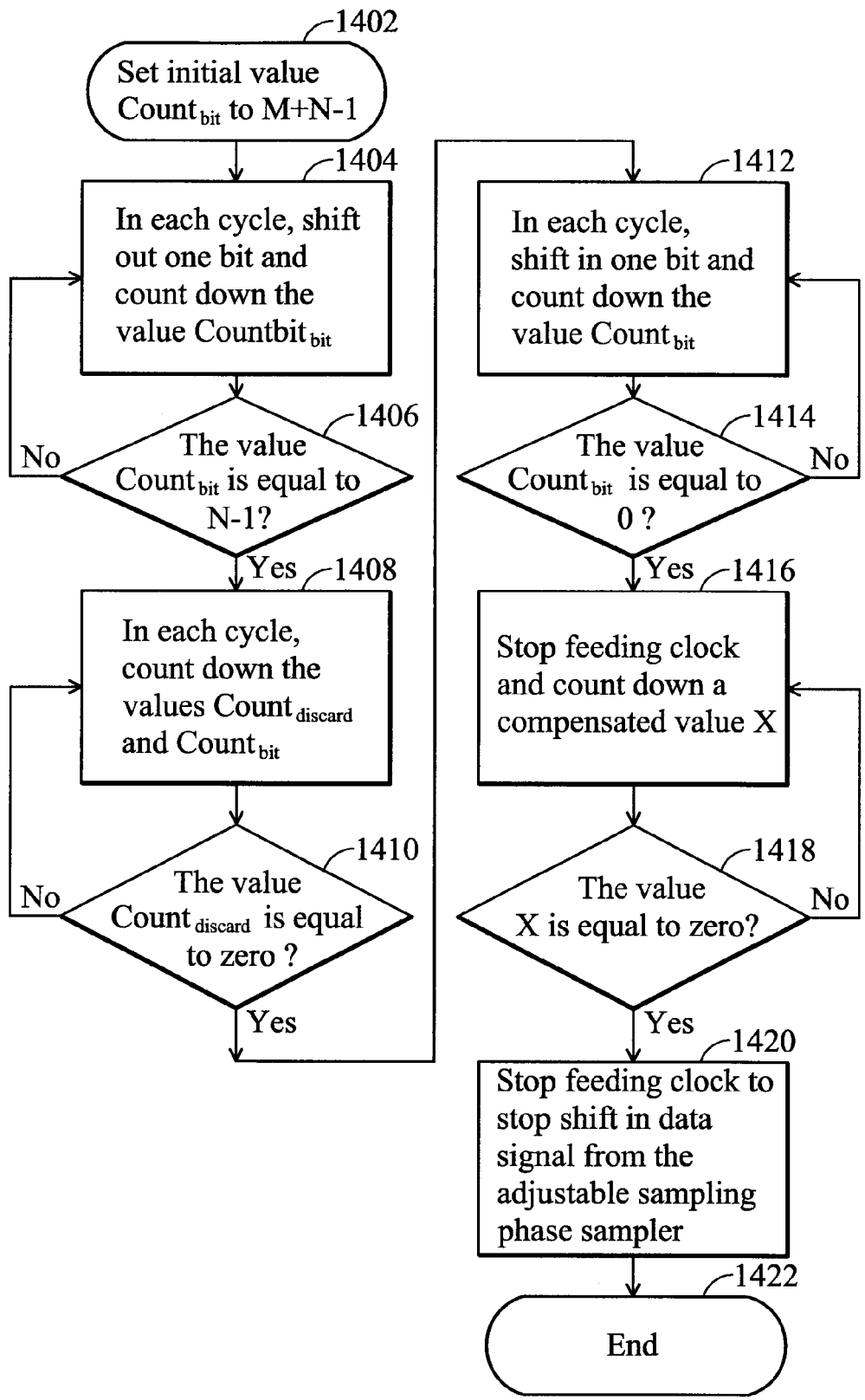
FIG. 14 is a flow chart of a control method applied to a serial flash controller.

Please refer to FIG. 14. FIG. 14 is a flow chart of a control method applied to a serial flash controller. The steps of the method are given in the following.

Step 1402: Start (initial value of $Count_{bit}$ is equal to M+N−1).

Step 1404: In each cycle, shift out one bit of the parallel-to-serial shift register to a serial flash through its input pin and count down the value $Count_{bit}$.

Step 1406: Determine if the value $Count_{bit}$ is equal to N−1? If yes, proceed to step 1408; Otherwise proceed to step 1404.

Step 1408: In each cycle, count down the value of $Count_{discard}$ and the value of $Count_{bit}$.

Step 1410: Determine if the value $Count_{discard}$ is equal to zero. If yes, proceed to step 1412; Otherwise proceed to step 1408.

Step 1412: In each cycle, shift in one bit from the serial flash through its output pin and count down the value $Count_{bit}$.

Step 1414: Determine if the value $Count_{bit}$ is equal to zero. If yes, proceed to step 1416; Otherwise proceed to step 1412.

Step 1416: Stop feeding clock and count down a compensated value X to zero.

Step 1418: Determine if the value X is equal to zero? If yes, proceed to step 1420; Otherwise proceed to step 1416.

Step 1420: Stop feeding clock to stop shift in data signal from the phase sampler.

Step 1422: End.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded system capable of compensating time comprising:
   a serial flash for storing data comprising:
      a first input pin for receiving an operational clock;
      a second input pin for receiving an adjusted input signal; and
      an output pin for sending an output signal; and
   an access circuit coupled to the serial flash for accessing the serial flash, comprising:
      a processor for controlling operation of the access circuit;
      a serial flash controller for enabling the operational clock of the access circuit;
      a time compensator operated for compensating a timing of the output signal by referring to the operational clock, wherein the time compensator is a phase sampler for sampling the output signal to generate a compensated output signal; and
      a shift register coupled to the time compensator for converting data in parallel form to serial form;
   wherein the adjusted input signal is adjusted by the access circuit and shifted from the access circuit to the serial flash.

2. The embedded system according to claim 1, wherein the access circuit can access data at an edge of the operational clock.

3. The embedded system according to claim 1, wherein the phase sampler further comprises:
   a delay chain comprising a plurality of delay buffers, each delay buffer for providing different phases of the operational clock;
   a multiplexer (MUX) for selecting one clock from the plurality of delay buffers as a sampling clock according to a phase selection parameter; and
   a register for sampling the output signal to generate the compensated output signal according to the sampling clock.

4. The embedded system according to claim 1, wherein the phase sampler discards a plurality of incoming samples of the output signal according to a sampling parameter.

5. The embedded system according to claim 4, wherein the embedded system further comprises a clock selector for selecting a selected operational frequency of the operational clock.

6. The embedded system according to claim 5, wherein the clock selector is a clock divider comprises:
   a plurality of registers, each register providing a different operational frequency of the operational clock; and
   a multiplexer (MUX) for selecting one clock with the selected operational frequency from the plurality of registers.

7. An embedded system capable of compensating time comprising:
   a serial flash for storing data comprising:
      a input pin for receiving an adjusted input signal; and
      an output pin for sending an output signal; and
   an access circuit coupled to the serial flash for accessing the serial flash, comprising:
      a processor for controlling operation of the access circuit;
      a serial flash controller for enabling an operational clock of the access circuit;
         a time compensator operated for compensating a timing of the output signal by referring to the operational clock, wherein the time compensator is a phase sampler for sampling the output signal to generate a compensated output signal, wherein the phase sampler comprises:
            a delay chain comprising a plurality of delay buffers, each delay buffer for providing different phases of the operational clock;
            a multiplexer (MUX) for selecting one clock from the plurality of delay buffers as a sampling clock according to a phase selection parameter; and
            a register for sampling the output signal to generate the compensated output signal according to the sampling clock; and
         a shift register coupled to the time compensator for converting data in parallel form to serial form;
   wherein the adjusted input signal is adjusted by the access circuit and shifted from the access circuit to the serial flash, and the processor determines the phase selection parameter by comparing a pattern with different compensated output signals generated according to different sampling clocks.

8. An embedded system capable of compensating time comprising:
   a serial flash for storing data comprising:
      a input pin for receiving an adjusted input signal; and
      an output pin for sending an output signal; and
   an access circuit coupled to the serial flash for accessing the serial flash, comprising:
      a processor for controlling operation of the access circuit;
      a serial flash controller for enabling an operational clock of the access circuit;
      a time compensator operated for compensating a timing of the output signal by referring to the operational clock, wherein the time compensator is a phase sampler for sampling the output signal to generate a compensated output signal and wherein the phase sampler further comprises:
         a delay chain comprising a plurality of delay buffers, each delay buffer providing a different phase of the operational clock;
         a first multiplexer (MUX) for selecting one clock from the plurality of delay buffers as a sampling clock according to a phase selection parameter;
         a first register for sampling the output signal at a positive edge of the sampling clock to generate a first temporary compensated output signal;
         a second register for sampling the output signal at a negative edge of the sampling clock to generate a second temporary compensated output signal; and
         a second multiplexer (MUX) for selecting from the first and second temporary compensated output signals to generate the compensated output signal; and
      a shift register coupled to the time compensator for converting data in parallel form to serial form;
   wherein the adjusted input signal is adjusted by the access circuit and shifted from the access circuit to the serial flash.

9. The embedded system according to claim 8, wherein the processor determines the phase selection parameter by comparing a pattern with different compensated output signals generated according to different sampling clocks.

10. An embedded system capable of compensating time comprising:
   a serial flash for storing data comprising:
   a input pin for receiving an adjusted input signal; and
   an output pin for sending an output signal; and
   an access circuit coupled to the serial flash for accessing the serial flash, comprising:
      a processor for controlling operation of the access circuit;
      a serial flash controller for enabling an operational clock of the access circuit;
         a time compensator operated for compensating a timing of the output signal by referring to the operational clock, wherein the time compensator is a phase sampler for sampling the output signal to generate a compensated output signal, and wherein the phase sampler comprises:
            a first delay chain comprising a plurality of first delay buffers, each first delay buffer for providing different phases of the operational clock;
            a first multiplexer (MUX) for selecting one clock from the plurality of first delay buffers as a sampling clock according to a phase selection parameter;
            a second delay chain comprising a plurality of second delay buffers, each second delay buffer providing different phases of the output signal;
            a second multiplexer (MUX) for selecting one signal from the plurality of second delay buffers as a hold-time-compensated output signal according to a hold-time select parameter; and a register for sampling the hold-time-compensated output signal to generate the compensated output signal according to the sampling clock; and a shift register coupled to the time compensator for converting data in parallel form to serial form;

wherein the adjusted input signal is adjusted by the access circuit and shifted from the access circuit to the serial flash.

11. The embedded system according to claim 10, wherein the processor determines the phase selection parameter by comparing a pattern with different compensated output signals generated according to different sampling clocks.

12. An embedded system capable of compensating time comprising:

a serial flash for storing data comprising:
a input pin for receiving an adjusted input signal; and
an output pin for sending an output signal; and
an access circuit coupled to the serial flash for accessing the serial flash, comprising:
a processor for controlling operation of the access circuit;
a serial flash controller for enabling an operational clock of the access circuit;
a time compensator operated for compensating a timing of the output signal by referring to the operational clock, wherein the time compensator is a phase sampler for sampling the output signal to generate a compensated output signal and for discarding a plurality of incoming samples of the output signal according to a sampling parameter;
a shift register coupled to the time compensator for converting data in parallel form to serial form; and
a clock selector for selecting a selected operational frequency of the operational clock, wherein the clock selector is a clock divider comprising:
a plurality of registers, each register providing a different operational frequency of the operational clock; and
a multiplexer (MUX) for selecting one clock with the selected operational frequency from the plurality of registers;

wherein the adjusted input signal is adjusted by the access circuit and shifted from the access circuit to the serial flash, and if the clock selector selects a high operational frequency of the operational clock, a sampling phase of the phase sampler is adjusted to make a valid region of the compensated output signal overlap with positive edge of the operational clock and the sampling parameter is increased to delay one clock cycle of the compensated output signal to compensate the setup time violation due to a critical path between the phase sampler and the shift register, wherein the high operational frequency satisfies the equation:

$$T-\Delta t < T_{setup} + T_{trans}$$

wherein T is a period of the operational clock, $\Delta t$ is a time difference between an edge of the operational clock and a sampling time of the sampling signal, $T_{setup}$ is a setup time depending on a manufacturing process, and $T_{trans}$ affected by the distance between the phase sampler and the shift register is a time that the compensated output signal becomes valid after the sampling time.

13. An embedded system capable of adjusting time comprising:

a serial flash for storing data comprising:
a first input pin for receiving an adjusted operational clock;
a second input pin for receiving an adjusted input signal; and
an output pin for sending an output signal; and
an access circuit coupled to the serial flash for accessing the serial flash, comprising:
a processor for controlling operation of the access circuit;
a serial flash controller for enabling an operational clock of the access circuit;
a first time adjuster coupled to the first input pin of the serial flash for adjusting a timing of the operational clock to generate the adjusted operational clock;
a second time adjuster coupled to the second input pin of the serial flash for adjusting a timing of an input signal to generate the adjusted input signal;
shift register coupled to the output pin of the serial flash for converting data in parallel form to serial form; and
a time compensator coupled to the output pin of the serial flash and the shift register for compensating a timing of the output signal by referring to the operational clock, wherein the time compensator is a phase sampler for sampling the output signal to generate a compensated output signal.

14. The embedded system according to claim 13, wherein the access circuit can access data at an edge of the operational clock.

15. The embedded system according to claim 13, wherein the first and second time adjusters are delay chain modules for tuning phases of the operational clock and the input signal, respectively.

16. The embedded system according to claim 15, wherein the delay each of the delay chain modules further comprises:
a delay chain comprising a plurality of delay buffers, each delay buffer providing a different phase; and
a multiplexer (MUX) for selecting one signal from the plurality of delay buffers as its output according to a phase selection parameter.

17. The embedded system according to claim 13, wherein the time compensator discards a plurality of incoming samples of the output signal according to a sampling parameter.

18. The embedded system according to claim 17, wherein the access circuit further comprises:
a clock selector for selecting a selected operational frequency of the operational clock.

19. An embedded system capable of adjusting time comprising:

a serial flash for storing data comprising:
a first input pin for receiving an adjusted operational clock;
a second input pin for receiving an adjusted input signal; and
an output pin for sending an output signal; and
an access circuit coupled to the serial flash for accessing the serial flash, comprising:
a processor for controlling operation of the access circuit;
a serial flash controller for enabling an operational clock of the access circuit;
a first time adjuster coupled to the first input pin of the serial flash for adjusting a timing of the operational clock to generate the adjusted operational clock;
a second time adjuster coupled to the second input pin of the serial flash for adjusting a timing of an input signal to generate the adjusted input signal;
a shift register coupled to the output pin of the serial flash for converting data in parallel form to serial form;

a time compensator coupled to the output pin of the serial flash and the shift register for compensating a timing of the output signal by referring to the operational clock, wherein the time compensator discards a plurality of incoming samples of the output signal according to a sampling parameter; and a clock selector for selecting a selected operational frequency of the operational clock;

wherein if the clock selector selects a high operational frequency of the operational clock, sampling phase of a phase sampler is adjusted to make a valid region of the compensated output signal overlap with positive edge of the operational clock and the sampling parameter is increased to delay one clock cycle of the compensated output signal to compensate the setup time violation due to a critical path between the phase sampler and the shift register wherein the high operational frequency satisfies the equation:

$$T - \Delta t < T_{setup} + T_{trans}$$

wherein T is a period of the operational clock, $\Delta t$ is a time difference between an edge of the operational clock and a sampling time of the sampling signal, $T_{setup}$ is a setup time depending on a manufacturing process, and $T_{trans}$ affected by the distance between the phase sampler and the shift register is a time that the compensated output signal becomes valid after the sampling time.

20. A method of controlling an embedded system, said embedded system being capable of compensating time, the method comprising:
receiving an adjusted input signal;
sending an output signal;
enabling an operational clock;
compensating a timing of the output signal by referring to the operational clock, wherein the output signal is sampled to generate a compensated output signal and the step of sampling the output signal comprising:
providing different phases of the operational clock;
selecting one clock as a sampling clock according to a phase selection parameter; and
sampling the output signal to generate the compensated output signal according to the sampling clock; and
converting data in parallel form to serial form;
wherein the phase selection parameter is determined by comparing a pattern with different compensated output signals generated according to different sampling clocks.

21. A method of controlling an embedded system, said embedded system being capable of compensating time, the method comprising:
receiving an adjusted input signal;
sending an output signal;
enabling an operational clock;
compensating a timing of the output signal by referring to the operational clock, wherein the output signal is sampled to generate a compensated output signal, and the step of sampling the output signal further comprises:
providing a different phase of the operational clock;
selecting one clock as a sampling clock according to a phase selection parameter;
sampling the output signal at a positive edge of the sampling clock to generate a first temporary compensated output signal;
sampling the output signal at a negative edge of the sampling clock to generate a second temporary compensated output signal;
selecting from the first and second temporary compensated output signals to generate the compensated output signal; and
converting data in parallel form to serial form.

22. The method according to claim 21, wherein the phase selection parameter is determined by comparing a pattern with different compensated output signals generated according to different sampling clocks.

23. A method of controlling an embedded system, said embedded system being capable of compensating time, the method comprising:
receiving an adjusted input signal;
sending an output signal;
enabling an operational clock;
compensating a timing of the output signal by referring to the operational clock, wherein the output signal is sampled to generate a compensated output signal and the step of sampling the output signal further comprises:
providing different phases of the operational clock;
selecting one clock as a sampling clock according to a phase selection parameter;
providing different phases of the output signal;
selecting one signal from a plurality of second delay buffers as a hold-time-compensated output signal according to a hold-time select parameter;
sampling the hold-time-compensated output signal to generate the compensated output signal according to the sampling clock; and
converting data in parallel form to serial form.

24. The method according to claim 23, wherein the phase selection parameter is determined by comparing a pattern with different compensated output signals generated according to different sampling clocks.

25. A method of controlling an embedded system, said embedded system being capable of compensating time, the method comprising:
receiving an adjusted input signal;
sending an output signal;
enabling an operational clock;
compensating a timing of the output signal by referring to the operational clock, wherein the output signal is sampled to generate a compensated output signal and a plurality of incoming samples of the output signal is discarded according to a sampling parameter;
selecting a selected operational frequency of the operational clock, wherein the step of selecting the selected operational frequency further comprises:
providing a different operational frequency of the operational clock;
selecting one clock with the selected operational frequency from a plurality of delay buffers; and
converting data in parallel form to serial form;
wherein if the clock selector selects a high operational frequency of the operational clock, a sampling phase is adjusted to make a valid region of the compensated output signal overlap with positive edge of the operational clock and the sampling parameter is increased to delay one clock cycle of the compensated output signal to compensate the setup time violation due to a critical path wherein the high operational frequency satisfies the equation:

$$T - \Delta t < T_{setup} + T_{trans}$$

wherein T is a period of the operational clock, $\Delta t$ is a time difference between an edge of the operational clock and a sampling time of sampling signal, $T_{setup}$ is a setup time depending on a manufacturing process, and $T_{trans}$ is a time that the compensated output signal becomes valid after the sampling time.

26. A method of controlling an embedded system, said embedded system being capable of adjusting time, the method comprising:
receiving an adjusted operational clock by a serial flash;
receiving an adjusted input signal by the serial flash;
sending an output signal by the serial flash;
enabling an operational clock of an access circuit by a serial flash controller;
adjusting a timing of the operational clock to generate the adjusted operational clock by a first time adjuster;
adjusting a timing of an input signal to generate the adjusted input signal by a second time adjuster;
compensating a timing of the output signal by referring to the operational clock by a time compensator, wherein the time compensator is a phase sampler for sampling the output signal to generate a compensated output signal; and
converting data in parallel form to serial form by a shift register.

27. The method according to claim 26, wherein the data can be accessed at an edge of the operational clock.

28. The method according to claim 26, wherein phases of the input signal and the operational clock are tuned.

29. The method according to claim 28, wherein the step of tuning phases further comprises:
providing a different phase; and
selecting one signal from a plurality of delay buffers as its output according to a phase selection parameter.

30. The method according to claim 26, wherein a plurality of incoming samples of the output signal is discarded according to a sampling parameter.

31. The method according to claim 30 further comprising selecting a selected operational frequency of the operational clock.

32. The method according to claim 26, further comprising:
selecting a selected operational frequency of the operational clock by a clock selector; and
adjusting a sampling phase to make a valid region of the compensated output signal overlap with positive edge of the operational clock if a high operational frequency of the operational clock is selected.

33. A method of controlling an embedded system, said embedded system being capable of adjusting time, the method comprising:
receiving an adjusted operational clock;
receiving an adjusted input signal;
sending an output signal;
enabling an operational clock of the access circuit;
selecting a selected operational frequency of the operational clock;
adjusting a timing of the operational clock to generate the adjusted operational clock;
adjusting a timing of an input signal to generate the adjusted input signal;
compensating a timing of the output signal by referring to the operational clock, wherein a plurality of incoming samples of the output signal is discarded according to a sampling parameter; and
converting data in parallel form to serial form;
wherein if a high operational frequency of the operational clock is selected, a sampling phase is adjusted to make a valid region of the compensated output signal overlap with positive edge of the operational clock and the sampling parameter is increased to delay one clock cycle of the compensated output signal to compensate the setup time violation due to a critical path wherein the high operational frequency satisfies the equation:

$$T-\Delta t<T_{setup}+T_{trans}$$

wherein T is a period of the operational clock, $\Delta t$ is a time difference between an edge of the operational clock and a sampling time of the sampling signal, $T_{setup}$ is a setup time depending on a manufacturing process, and $T_{trans}$ is a time that the compensated output signal becomes valid after the sampling time.

34. An embedded system capable of compensating time comprising:
a serial flash for storing data comprising:
a input pin for receiving an adjusted input signal; and
an output pin for sending an output signal; and
an access circuit coupled to the serial flash for accessing the serial flash, comprising:
a processor for controlling operation of the access circuit;
a serial flash controller for enabling an operational clock of the access circuit;
a time compensator operated for compensating a timing of the output signal by referring to the operational clock; and
a shift register coupled to the time compensator for converting data in parallel form to serial form;
wherein the adjusted input signal is adjusted by the access circuit and shifted from the access circuit to the serial flash and the time compensator generates a sampling clock according to a phase selection parameter, and samples the output signal to generate a compensated output signal according to the sampling clock, and wherein the processor determines the phase selection parameter by comparing a pattern with different compensated output signals generated according to different sampling clocks.

35. An embedded system capable of adjusting time comprising:
a serial flash for storing data comprising:
a first input pin for receiving an adjusted operational clock;
a second input pin for receiving an adjusted input signal; and
an output pin for sending an output signal; and
an access circuit coupled to the serial flash for accessing the serial flash, comprising:
a processor for controlling operation of the access circuit;
a serial flash controller for enabling an operational clock of the access circuit;
a first time adjuster coupled to the first input pin of the serial flash for adjusting a timing of the operational clock to generate the adjusted operational clock;
a second time adjuster coupled to the second input pin of the serial flash for adjusting a timing of an input signal to generate the adjusted input signal; and
a shift register coupled to the output pin of the serial flash for converting data in parallel form to serial form;
wherein the access circuit further comprises a clock selector for selecting a selected operational frequency of the operational clock, wherein if the clock selector selects a high operational frequency of the operational clock, a sampling phase of a phase sampler is adjusted to make a valid region of a compensated output signal overlap with positive edge of the operational clock.

36. A method of controlling an embedded system, said embedded system being capable of compensating time, the method comprising:

inputting an operational clock to a serial flash;

receiving an adjusted input signal by the serial flash;

sending an output signal by the serial flash;

enabling the operational clock by a serial flash controller;

compensating a timing of the output signal by referring to the operational clock by a time compensator, wherein the time compensator is a phase sampler for sampling the output signal to generate a compensated output signal; and converting data in parallel form to serial form by a shift register;

wherein the step of compensating the timing of the output signal further comprising:

generating a sampling clock according to a phase selection parameter by the time compensator; and sampling the output signal to generate the compensated output signal according to the sampling clock by the time compensator;

wherein the phase selection parameter is determined by comparing a pattern with different compensated output signals generated according to different sampling clocks by a processor.

37. The method according to claim 36, wherein a plurality of incoming samples of the output signal is discarded according to a sampling parameter.

38. The method according to claim 37 further comprises: selecting a selected operational frequency of the operational clock.

39. The method according to claim 38, wherein the step of selecting the selected operational frequency further comprises:

providing a different operational frequency of the operational clock; and selecting one clock with the selected operational frequency from a plurality of delay buffers.

40. The method according to claim 36, wherein data is accessed at an edge of the operational clock.

\* \* \* \* \*